(12) United States Patent
Rawls-Meehan

(10) Patent No.: US 7,805,785 B2
(45) Date of Patent: *Oct. 5, 2010

(54) METHODS AND SYSTEMS OF AN ADJUSTABLE BED

(76) Inventor: Martin B Rawls-Meehan, 9 Winthrop Rd., Lexington, MA (US) 02421

( * ) Notice: Subject to any disclaimer, the term of this patent is extended or adjusted under 35 U.S.C. 154(b) by 0 days.

This patent is subject to a terminal disclaimer.

(21) Appl. No.: 11/875,851

(22) Filed: Oct. 20, 2007

(65) Prior Publication Data

US 2008/0120777 A1    May 29, 2008

Related U.S. Application Data

(63) Continuation of application No. 11/855,354, filed on Sep. 14, 2007.

(60) Provisional application No. 60/825,607, filed on Sep. 14, 2006.

(51) Int. Cl.
*A61G 7/002* (2006.01)
*G05D 1/02* (2006.01)

(52) U.S. Cl. .......................... 5/616; 700/302

(58) Field of Classification Search ............. 5/616; 700/302
See application file for complete search history.

(56) References Cited

U.S. PATENT DOCUMENTS

| | | | |
|---|---|---|---|
| 4,095,296 A | | 6/1978 | Ferro |
| 5,235,258 A * | | 8/1993 | Schuerch .................. 318/16 |
| 5,664,270 A * | | 9/1997 | Bell et al. ................. 5/600 |
| 5,771,511 A * | | 6/1998 | Kummer et al. ............ 5/600 |
| 5,787,528 A * | | 8/1998 | Antinori .................... 5/616 |
| 5,969,488 A * | | 10/1999 | Fromson ................... 318/16 |
| 6,008,598 A * | | 12/1999 | Luff et al. ................ 318/16 |
| 6,079,065 A * | | 6/2000 | Luff et al. ................ 5/618 |
| 6,276,011 B1 | | 8/2001 | Antinori |
| 6,393,641 B1 | | 5/2002 | Hensley |
| 7,000,269 B2 | | 2/2006 | Borda |
| 7,174,586 B2 * | | 2/2007 | Nagaoka ................... 5/509.1 |
| 7,242,308 B2 * | | 7/2007 | Ulrich et al. ............. 340/573.1 |
| 7,315,535 B2 * | | 1/2008 | Schuman .................. 370/349 |
| 7,321,811 B1 * | | 1/2008 | Rawls-Meehan ............ 700/302 |
| 7,322,058 B2 * | | 1/2008 | Long ........................ 5/600 |
| 7,346,944 B2 * | | 3/2008 | Shaw ........................ 5/616 |

(Continued)

OTHER PUBLICATIONS

"U.S. Appl. No. 11/855,354, Non-Final Office Action mailed Dec 16, 2009", 21.

(Continued)

*Primary Examiner*—Michael Trettel
(74) *Attorney, Agent, or Firm*—Strategic Patents, P.C.

(57) ABSTRACT

Aspects of this invention relate to an adjustable bed that may include one or more articulating portions, and may include one or more components, including an air inflatable mattress associated with the adjustable bed frame, a programmable logic controller, a remote memory storage facility, a remote storage location of user preferences, a cell phone remote control, a modular control device, an air purification facility, a power outlet controller, a Bluetooth remote control, an ultra wide band remote control, a wireless USB remote control, and the like.

13 Claims, 9 Drawing Sheets

U.S. PATENT DOCUMENTS

| | | | |
|---|---|---|---|
| 2004/0216235 A1* | 11/2004 | Rees | 5/618 |
| 2005/0011005 A1 | 1/2005 | Borda | |
| 2006/0058587 A1* | 3/2006 | Heimbrock et al. | 600/300 |
| 2007/0163045 A1* | 7/2007 | Becker et al. | 5/616 |
| 2008/0104761 A1 | 5/2008 | Rawls-Meehan | |
| 2008/0224861 A1* | 9/2008 | McNeely et al. | 340/540 |

OTHER PUBLICATIONS

"U.S. Appl. No. 11/855,354, Final Office Action mailed Jul. 6, 2010", , 11 Pgs.

"U.S. Appl. No. 12/328,728, Non-Final Office Action mailed Jun. 23, 2010", , 19.

* cited by examiner

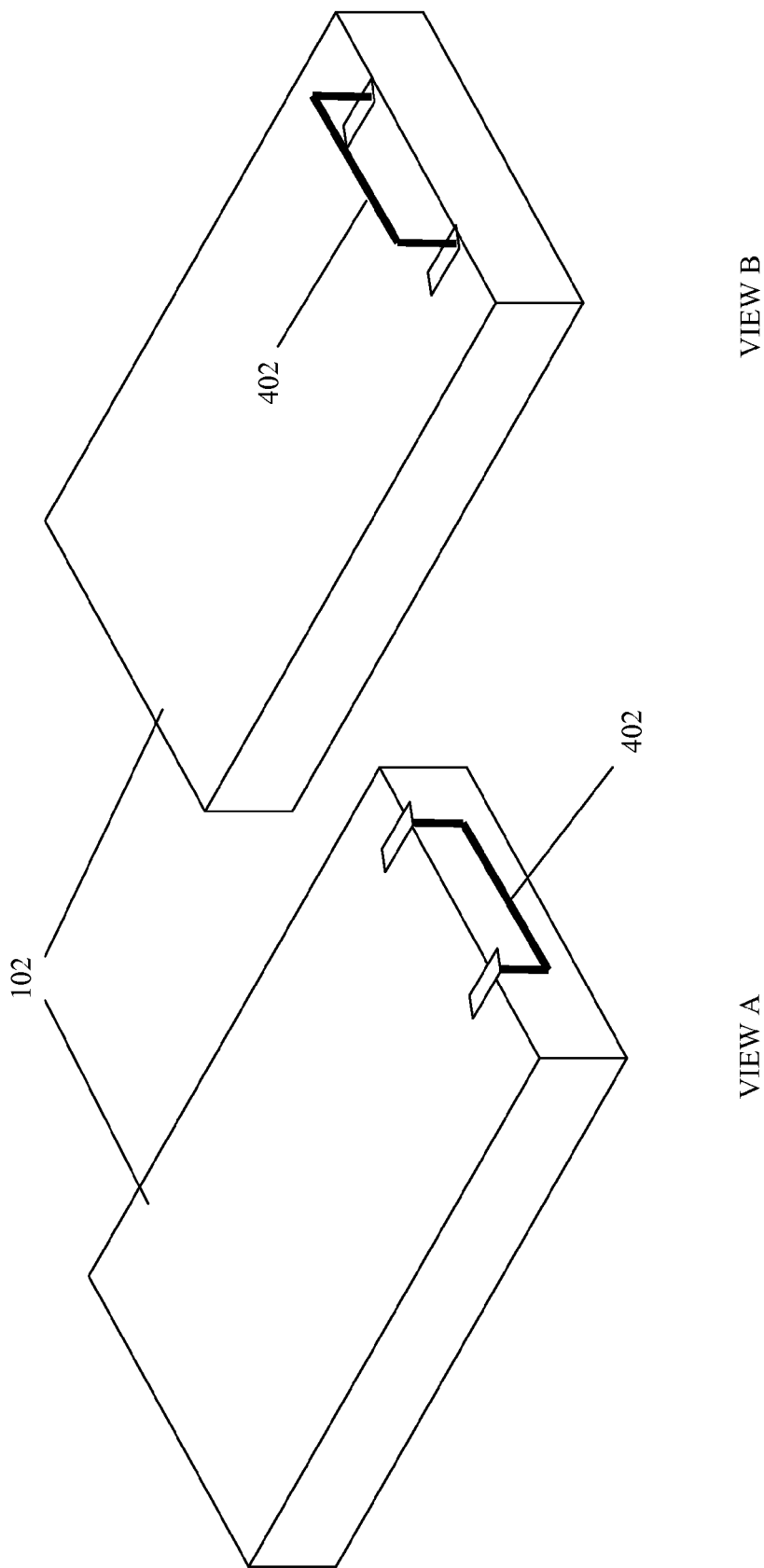

METHODS AND SYSTEMS OF AN ADJUSTABLE BED

CROSS-REFERENCE TO RELATED APPLICATIONS

This application claims the benefit of the U.S. Provisional. App. No. 60/825,607 filed on Sep. 14, 2006.

In an embodiment, the adjustable bed systems and methods described herein could be used in combination with the systems and methods disclosed in U.S. Provisional Patent Application No. 60/823,891 filed on Aug. 29, 2006, and incorporated by reference herein.

BACKGROUND

1. Field

This invention relates to an adjustable bed.

2. Background

Adjustable beds may contain at least one section of which a user may control the position. The user may typically adjust the bed by using a control to move the adjustable section in its direction of movement. Additionally, the adjustable bed may include various types of mattresses and vibration of sections. Often, users that have adjustable beds because a medical issue may require certain positions to aid recovery, positioning to relieve discomfort as a result of pain, or the like. These users may, because of these issues, spend significant amount of time in the adjustable beds, some users may be confined to bed.

Many existing adjustable beds may provide the basic requirements of moving bed sections to positions that are required by a user, but do not account for controlling other devices that may be beneficial to the user and provide for a level of independence to the user.

A typical adjustable bed may consist of a wood decking for each of the sections of the bed connected together with hinges to allow the various positions between the sections. There are actuators connected between the bed frame and the wood decking for moving the adjustable sections into user-desired positions. The adjustable bed may have a "wall hugging" feature that maintains a consistent distance between the mattress and the wall as the bed is adjusted. Some adjustable beds may use wooden or plastic slats to support the mattress instead of a solid wood platform.

The adjustable bed may have at least one actuator to position the adjustable bed sections. In some cases there is one actuator to position more than one, such as positioning both the thigh and foot sections with one actuator. There may also be more than one actuator for each adjustable section.

Hospitals have used adjustable beds for many years to provide comfortable and medical required positions.

A need exists for an adjustable bed that provides for the adjustable function required in an adjustable bed and provides for control of additional devices, a plurality of different bed section actuator types and movable memory types that may provide independent activities to the user of the adjustable bed.

SUMMARY

Provided herein are methods and systems for an adjustable bed facility. Aspects of this invention relate to an adjustable bed that may include one or more articulating portions, and may include one or more components, including an air inflatable mattress associated with the adjustable bed frame, a programmable logic controller, a remote memory storage facility, a remote storage location of user preferences, a cell phone remote control, a modular control device, an air purification facility, a power outlet controller, a Bluetooth remote control, an ultra wide band remote control, a wireless USB remote control, and the like An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress can flex, a programmable logic controller (PLC) may be associated with the adjustable bed frame adapted to control at least one adjustable aspect of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, a remote memory storage facility may be adapted to be removeably and replaceably connected to an adjustable bed frame controller associated with the adjustable bed frame, the remote memory may include information relating to at least one operational parameter related to control of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, a remote storage location of user preferences, where the user preferences may represent recall parameters relating to one or more adjustable aspects of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may flex regions about which the air inflatable mattress can flex, a cell phone remote control may be adapted to control at least one adjustable aspect of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, a modular control device, where the modular control device may be adapted to control at least one aspect of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, an air purification facility associated with the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, a power outlet controller may be adapted to control at least one parameter of a power outlet associated with the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, a Bluetooth remote control may be adapted to control at least one adjustable aspect of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex; an ultra wide band (UWB) remote control adapted to control at least one adjustable aspect of the adjustable bed, and the like.

An apparatus disclosed herein includes an adjustable bed that may include one or more articulating portions, including an air inflatable mattress associated with the adjustable bed frame, where the air adjustable mattress may be associated with an air pump to regulate the air pressure in the air inflatable mattress, the air inflatable mattress may include flex regions about which the air inflatable mattress may flex, a wireless USB remote control adapted to control at least one adjustable aspect of the adjustable bed, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a remote memory storage facility that may be adapted to be removeably and replaceably connected to the PLC, where the remote memory may include information relating to at least one operational parameter related to control of the adjustable bed, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a remote storage location of user preferences, where the user preferences may represent recall parameters accessible by the PLC relating to one or more adjustable aspects of the adjustable bed, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a cell phone remote control that may be adapted to control at least one adjustable aspect of the adjustable bed by communicating with the PLC, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a modular control device, where the modular control device may be adapted to control at least one aspect of the adjustable bed by communicating with the PLC, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, an air purification facility that may be associated with the adjustable bed, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a power outlet controller that may be adapted to control at least one parameter of a power outlet associated with the adjustable bed by communicating with the PLC, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a Bluetooth remote control that may be adapted to control at least one adjustable aspect of the adjustable bed by communicating with the PLC, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, an ultra wide band (UWB) remote control that may be adapted to control at least one adjustable aspect of the adjustable bed by communicating with the PLC, and the like.

An apparatus disclosed herein includes an adjustable bed that may include one or more articulating portions, including a programmable logic controller (PLC) associated with the adjustable bed frame that may be adapted to control at least one adjustable aspect of the adjustable bed, a wireless USB remote control that may be adapted to control at least one adjustable aspect of the adjustable bed by communicating with the PLC, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may include information relating to at least one operational parameter related to control of the adjustable bed. In addition, the remote memory storage facility may store user preferences, the user preferences may represent recall parameters relating to one or more adjustable aspects of the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may includes information relating to at least one operational parameter related to control of the adjustable bed, a cell phone remote control that may be adapted to control at least one adjustable aspect of the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may includes information relating to at least one operational parameter related to control of the adjustable bed, a modular control device, where the modular control device may be adapted to control at least one aspect of the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may include information relating to at least one operational parameter related to control of the adjustable bed, an air purification facility associated with the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may include information relating to at least one operational parameter related to control of the adjustable bed, a power outlet controller adapted to control at least one parameter of a power outlet associated with the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may include information relating to at least one operational parameter related to control of the adjustable bed, a Bluetooth remote control adapted to control at least one adjustable aspect of the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may include information relating to at least one operational parameter related to control of the adjustable bed, an ultra wide band (UWB) remote control adapted to control at least one adjustable aspect of the adjustable bed, and the like.

An apparatus disclosed herein includes an adjustable bed that may include one or more articulating portions, including a remote memory storage facility that may be adapted to be removeably and replaceably connected to an adjustable bed frame controller associated with the adjustable bed frame, where the remote memory may include information relating to at least one operational parameter related to control of the adjustable bed, a wireless USB remote control adapted to control at least one adjustable aspect of the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, a cell phone remote control adapted to control at least one adjustable aspect of the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, a modular control device, where the modular control device may be adapted to control at least one aspect of the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, an air purification facility associated with the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, a power outlet controller adapted to control at least one parameter of a power outlet associated with the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, a Bluetooth remote control adapted to control at least one adjustable aspect of the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, an ultra wide band (UWB) remote control adapted to control at least one adjustable aspect of the adjustable bed, and the like.

An apparatus disclosed herein includes an adjustable bed that may include one or more articulating portions, including a remote storage location of user preferences, where the user preferences may represent recall parameters relating to one or more adjustable aspects of the adjustable bed, a wireless USB remote control adapted to control at least one adjustable aspect of the adjustable bed, and the like.

An apparatus disclosed herein includes an adjustable bed that may include one or more articulating portions, including a cell phone remote control that may be adapted to control at least one adjustable aspect of the adjustable bed, a modular control device, where the modular control device may be adapted to control at least one aspect of the adjustable bed, and the like.

An apparatus disclosed herein includes an adjustable bed that may include one or more articulating portions, including a cell phone remote control that may be adapted to control at least one adjustable aspect of the adjustable bed, an air purification facility associated with the adjustable bed, and the like.

An apparatus disclosed herein includes an adjustable bed that may include one or more articulating portions, including a cell phone remote control that may be adapted to control at least one adjustable aspect of the adjustable bed, a power outlet controller adapted to control at least one parameter of a power outlet associated with the adjustable bed, and the like.

An apparatus disclosed herein includes an adjustable bed that may include one or more articulating portions, including a cell phone remote control that may be adapted to control at least one adjustable aspect of the adjustable bed, a Bluetooth remote control adapted to control at least one adjustable aspect of the adjustable bed, and the like.

An apparatus disclosed herein includes an adjustable bed that may include one or more articulating portions, including a cell phone remote control that may be adapted to control at least one adjustable aspect of the adjustable bed, an ultra wide band (UWB) remote control adapted to control at least one adjustable aspect of the adjustable bed, and the like.

An apparatus disclosed herein includes an adjustable bed that may include one or more articulating portions, including a cell phone remote control that may be adapted to control at least one adjustable aspect of the adjustable bed, a wireless USB remote control adapted to control at least one adjustable aspect of the adjustable bed, and the like.

An apparatus disclosed herein includes an adjustable bed that may include one or more articulating portions, including a modular control device, where the modular control device may be adapted to control at least one aspect of the adjustable bed, an air purification facility associated with the adjustable bed, and the like.

An apparatus disclosed herein includes an adjustable bed that may include one or more articulating portions, including a modular control device, where the modular control device may be adapted to control at least one aspect of the adjustable bed, a power outlet controller adapted to control at least one parameter of a power outlet associated with the adjustable bed, and the like.

An apparatus disclosed herein includes an adjustable bed that may include one or more articulating portions, including a modular control device, where the modular control device may be adapted to control at least one aspect of the adjustable bed, a Bluetooth remote control adapted to control at least one adjustable aspect of the adjustable bed, and the like.

An apparatus disclosed herein includes an adjustable bed that may include one or more articulating portions, including a modular control device, where the modular control device may be adapted to control at least one aspect of the adjustable bed, an ultra wide band (UWB) remote control adapted to control at least one adjustable aspect of the adjustable bed, and the like.

An apparatus disclosed herein includes an adjustable bed that may include one or more articulating portions, including a modular control device, where the modular control device may be adapted to control at least one aspect of the adjustable bed, a wireless USB remote control adapted to control at least one adjustable aspect of the adjustable bed, and the like.

An apparatus disclosed herein includes an adjustable bed that may include one or more articulating portions, including an air purification facility associated with the adjustable bed, a power outlet controller adapted to control at least one parameter of a power outlet associated with the adjustable bed, and the like.

An apparatus disclosed herein includes an adjustable bed that may include one or more articulating portions, including an air purification facility associated with the adjustable bed, a Bluetooth remote control adapted to control at least one adjustable aspect of the adjustable bed, and the like.

An apparatus disclosed herein includes an adjustable bed that may include one or more articulating portions, including an air purification facility associated with the adjustable bed, an ultra wide band (UWB) remote control adapted to control at least one adjustable aspect of the adjustable bed, and the like.

An apparatus disclosed herein includes an adjustable bed that may include one or more articulating portions, including an air purification facility associated with the adjustable bed, a wireless USB remote control adapted to control at least one adjustable aspect of the adjustable bed, and the like.

An apparatus disclosed herein includes an adjustable bed that may include one or more articulating portions, including a power outlet controller that may be adapted to control at least one parameter of a power outlet associated with the adjustable bed, a Bluetooth remote control adapted to control at least one adjustable aspect of the adjustable bed, and the like.

An apparatus disclosed herein includes an adjustable bed that may include one or more articulating portions, including a power outlet controller that may be adapted to control at least one parameter of a power outlet associated with the adjustable bed, an ultra wide band (UWB) remote control adapted to control at least one adjustable aspect of the adjustable bed, and the like.

An apparatus disclosed herein includes an adjustable bed that may include one or more articulating portions, including a power outlet controller that may be adapted to control at least one parameter of a power outlet associated with the adjustable bed, a wireless USB remote control adapted to control at least one adjustable aspect of the adjustable bed, and the like.

An apparatus disclosed herein includes an adjustable bed that may include one or more articulating portions, including a Bluetooth remote control that may be adapted to control at least one adjustable aspect of the adjustable bed, an ultra wide band (UWB) remote control adapted to control at least one adjustable aspect of the adjustable bed, and the like.

An apparatus disclosed herein includes an adjustable bed that may include one or more articulating portions, including a Bluetooth remote control that may be adapted to control at least one adjustable aspect of the adjustable bed, a wireless USB remote control adapted to control at least one adjustable aspect of the adjustable bed, and the like.

An apparatus disclosed herein includes an adjustable bed that may include one or more articulating portions, including an ultra wide band (UWB) remote control that may be adapted to control at least one adjustable aspect of the adjustable bed, a wireless USB remote control adapted to control at least one adjustable aspect of the adjustable bed, and the like.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF FIGURES

The systems and methods described herein may be understood by reference to the following figures:

FIG. 4 shows an embodiment of the shipping of a mattress retainer bracket in the upside down position.

DETAILED DESCRIPTION OF FIGURES

Figure 1:
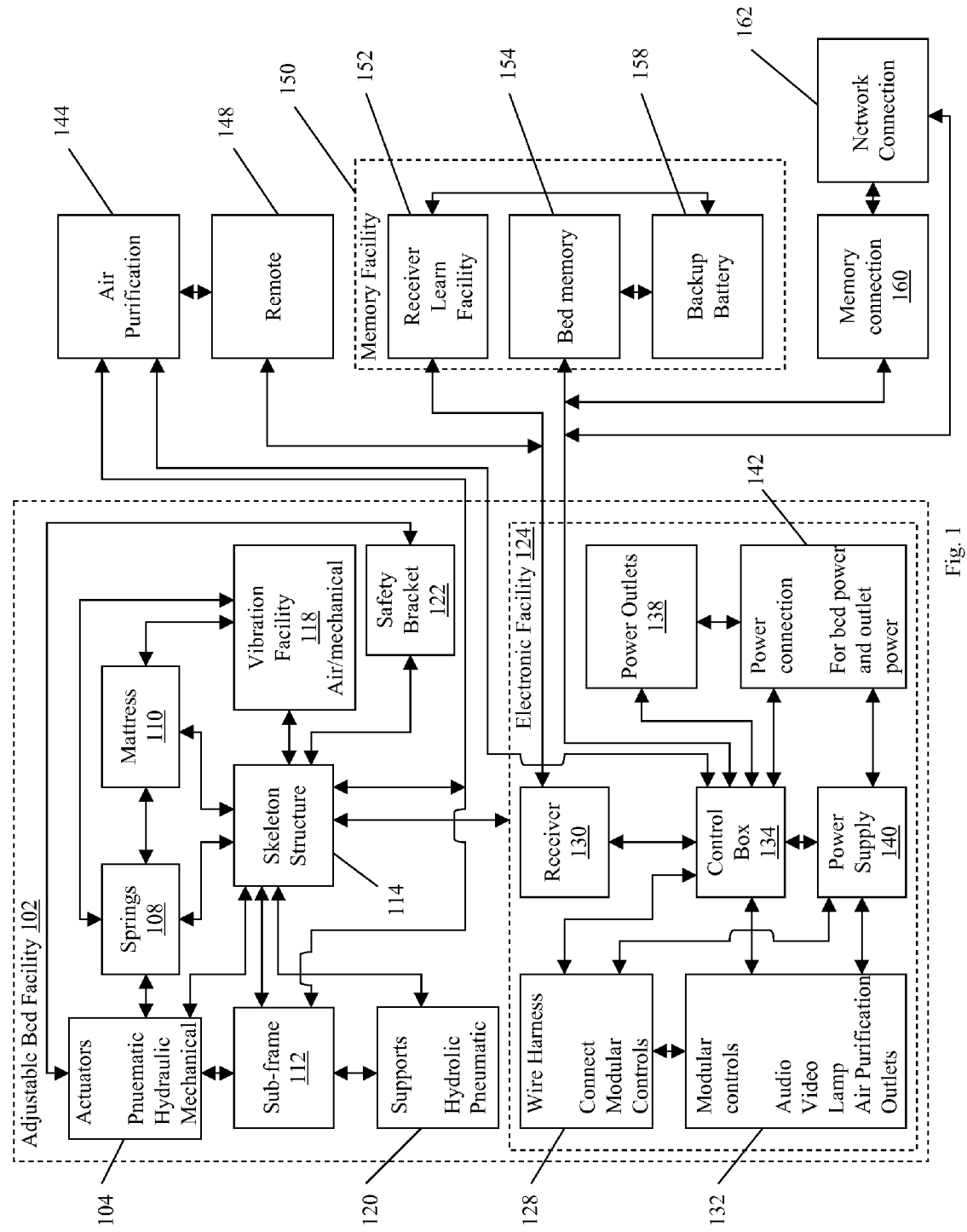
FIG. 1 shows a block diagram of an adjustable bed facility and associated components.

In the following description, terms such as 'adjustable mattress', 'adjustable bed', 'adjustable bed facility' and the like are used interchangeably to refer generally to an apparatus including a sleeping or resting surface with one or more adjustable or moveable sub-surfaces that can be positioned for user comfort and/or convenience, unless a specific meaning is explicitly provided or otherwise clear from the context As users spend more and more time in adjustable beds they may desire to have a level of independence by controlling devices that may be in the room from the adjustable bed. The devices and facilities that users may wish to control may include audio equipment, video equipment, lamps, air purification facilities, power outlets, and the like. It may be desirable for the user to control these devices and facilities from the adjustable bed without having to leave the bed or ask for aid from someone else. For example, the user may be confined to the bed and may want the simple ability to control the lights around the adjustable bed.

In an embodiment, an adjustable bed may not be the only rest facility to benefit from position and additional function control. Users may also use beds, adjustable beds, adjustable chairs, adjustable couches, and the like to provide comfortable positions when the user may have limited mobility. For example, a user that has had hip replacement surgery may not be confined to bed but may require a chair or couch to be adjustable to provide a comfortable sitting position while providing control of other devices within the room to limit the number of times the user must get up and adjust the devices. In an embodiment, while recovering from a surgery, an injury, an illness, or the like, the user may use more than one type of rest facility. The user may require confinement to an adjustable bed for a time and then, with health improvement, be able to move to either an adjustable chair or adjustable couch.

Aspects of the invention may be described as an adjustable bed, but it may be understood that the same aspects may be applied to other rest facilities that may include a bed, a couch, a chair, or the like. Such rest facilities may be in a home, a car, a recreational vehicle, a cruise ship, an airline, a train, or anywhere that a user required them, and they may be fixed or mobile.

One aspect of this invention may be to provide the adjustable bed with more than one power option to move the adjustable bed sections. The adjustable bed may use electric motors with gearboxes, pneumatic springs, hydraulic springs, or the like to actuate the adjustable bed sections. There may be both pricing and durability reasons to have the different actuation types.

Another aspect of this invention may be to provide the ability to provide additional functionality to the adjustable bed by using modular controls that may be able to communicate with the user's interface control. The modular controls may be designed to control a number of additional devices and facilities that may include audio devices, video devices, lamps, air purification facilities, power outlets, and the like.

Another aspect of the adjustable bed may be to provide a support structure to support the bed materials (e.g. mattress), motors, actuators, hinges between bed sections, and the like. The support structure may be a frame structure to provide the support yet remain lightweight.

Another aspect may be the use of replaceable memory to maintain the bed memory and software applications. The replaceable memory may allow user specific information to be moved from one adjustable bed to another adjustable bed. This may be useful in care facilities where a user may move from one bed to another bed during the stay in the care facility. If the user has saved a preferred positioning of the adjustable bed, when the user moves to another bed, the preferred positioning settings may be moved to the other bed with the user.

Another aspect of the adjustable bed may be to provide safety features that may control the retraction of the adjustable bed sections to reduce the risk of crushing an object that may be under the adjustable bed.

Now referring to FIG. 1, a block diagram of the various components of the adjustable bed facility 102 is shown. In an embodiment, an adjustable bed facility 102 may be made up of a number of devices and facilities that may include actuators 104, springs 108, mattresses 110, a sub-frame 112, a skeleton structure 114, vibration motors 118, supports 120, safety brackets 122, an electronic facility 124, an air purification facility 144, a remote 148, a memory facility 150, a memory connection 160, a network connection 162, and the like. In an embodiment, the electronic facility 124 may include a wire harness 128, a receiver 130, modular controls 132, a control box 134, power outlets 138, a power connection 142, and the like. In an embodiment, the memory facility 150 may include a receiver learn facility 152, bed memory 154, a backup battery 158, and the like. In an embodiment, the receiver learn facility 152, bed memory 154, and backup battery 158 may not be part of the memory facility 150, but may be combined into other facilities or devices, be stand-alone devices, or the like.

In an embodiment, the physical aspects of the adjustable bed facility 102 that provide support for the user may include the actuators 104, springs 108, mattresses 110, a sub-frame 112, a skeleton structure 114, vibration motors 118, supports 120, and safety brackets 122.

In an embodiment, the skeleton structure 114 may provide the central structure that the other physical aspects may interact with. In an embodiment, the skeleton structure 114 may provide direct support to the mattress 110, springs 108, and the like. In an embodiment, the skeleton structure 114 may be a lightweight frame structure that may provide both the strength and rigidity required to properly support the mattress 110 and springs 108. In embodiments, the skeleton structure 114 may use materials that include metal, plastic, wood, or the like; the materials may be used individually or in combination.

In an embodiment, springs 108 may be used with a mattress 110, instead of a mattress 110, or the like. In an embodiment, the springs may be a standard bed spring system (e.g. coils within a wire framework), individual coil springs, individual foam springs, air springs, or the like. In an embodiment, the individual springs (e.g. coil, foam, or air) may be used to provide variable firmness to provide comfort to the user. For example, the springs 108 may be less firm or firmer in a local area to provide the user with the support that may be required for a body location that is experiencing discomfort (e.g. a hip, shoulder, back, neck). Springs that may have local firmnesses will be described in more detail below.

In an embodiment, the mattress 110 may include foam, feathers, springs 108, material, or the like. In an embodiment, the different materials may be used individually or in combination. The mattress may be intended to provide the user with a firmness that provides for the comfort requirements of the user.

In an embodiment, the mattress 110 may be an air mattress 110. In an embodiment, the air mattress 110 may be constructed using a single chamber, a plurality of chambers, a plurality of individual chambers, a combination of chamber shapes, or the like. In an embodiment, the air mattress 110 may be inflated to various pressures that may provide the user with the desired comfort level. In an embodiment, there may be separate air mattresses 110 for each of the adjustable bed facility 102 sections. For example, there may be separate air mattresses 110 for the head, torso, and foot sections of the adjustable bed facility 102. In an embodiment, the inflation pressure of the individual air mattresses 110 may be different from each other depending on user settings.

In an embodiment, the adjustable bed facility 102 sections may each contain individual air mattresses 110. For example, the head, torso, and foot sections may each have individual air mattresses that may be individually controlled for air pressures and therefore firmness. In an embodiment, the user may be able to control the firmness of the individual air mattresses 110 using a remote 148. In an embodiment, the remote 148 may have indicators for each of the firmness adjustable air mattresses 110. For example, the remote 148 may have keys for increasing or decreasing the pressures of the individual air mattresses 148. Using the remote 148, the user may be able to adjust the firmness of the adjustable bed facility sections.

In an embodiment, the air mattress 110 may use a common air supply source facility as an air actuator 104. In an embodiment, a control box 134 may control both the air mattress 110 and air actuator 104. The control box 134 may provide controlling commands to both the air mattress 110 and air actuators.

In an embodiment, the skeleton structure 114 may have structural members that support the mattress 110 and springs 108 and may also provide support and connections for the actuators 104, sub-frame 112, supports 120, vibrator motors 118, safety bracket 122, and the like. In an embodiment, the structural members may be positioned on the peripheral edges of the mattress 110 and springs 108 to provide overall support and rigidity to the mattress 110 and springs 108 and may form the base of the individual adjustable bed facility 102 sections. Additionally, there may other structural members as support, cross pieces, or the like that may provide additional support to the mattress 110 and springs 108 as may be required. A person knowledgeable in the art may understand that the frame structure may have many different construction configurations to provide support and rigidity to the mattress 110 and springs 108.

In an embodiment, the skeleton structure 114 may form the base of the adjustable bed facility 102 sections that may be moved relative to each other to provide the various bed positions required by the user. The adjustable bed facility 102 may include more than one section; a section may be fixed or may be adjustable. For example, the typical adjustable bed may have adjustable sections for the head, leg, and foot while the torso section may remain fixed and horizontal. There may be different combinations of movable and fixed sections with one or all of the sections being movable. In an embodiment, the sections may include the skeleton structure 114, mattress 110, springs 108, and the like and may individually be small mattress structures of the entire adjustable bed facility 102 mattress.

In an embodiment, the adjustable bed sections may be connected together using hinges or like devices that allow a freedom of motion between two adjacent adjustable bed facility 102 sections. In an embodiment, one section of the adjustable bed may remain fixed, such as the torso section, and act as the foundation for the other movable sections to be positions. In an embodiment, any or none of the sections may be a fixed foundation section in the adjustable bed facility 102. In embodiments, there may be more than one adjustable bed facility 102 configuration depending on the requirements of a user, cost requirements, medical needs, or the like. For example, there may be a configuration where only the head section is adjustable to provide the user with the ability to have an elevated upper body position. This configuration may be a single purpose bed but may also provide the user with a less expensive adjustable bed facility 102 that meets the user's needs. One skilled in the art may understand that there may be many different adjustable bed facility configurations containing fixed and moveable sections.

In an embodiment, the skeleton structure 114, as part of each adjustable bed facility 102 section, may also provide support and connection members for the components that may be used to move the various adjustable bed facility 102 sections. There may be skeleton structure 114 members that provide connection support to the actuators 104, supports 120, safety brackets 122, vibration motors 118, and the like. These support and connection members may have any shape or configuration required to provide the support and connections needed by the various other components. For example, in addition to the skeleton structure 114 that is used to provide support to the mattress 110 and springs 108 there may be at least one cross member that may provide a connection to the actuator 104 and safety bracket 122.

In an embodiment, the skeleton structure 114 and the sub-frame 112 may interface with each other; the sub-frame 112 may provide structural support and a rigid foundation base to the skeleton structure 114. In an embodiment, the sub-frame 112 may be the rigid structure that is in contact to the floor and may provide a base for any fixed adjustable bed facility 102 sections and an interface for any movable adjustable bed facility 102 sections. In an embodiment, the sub-frame 112 legs may be connected to the sub-frame 112 using a threaded stud into threads of the sub-frame 112. In an embodiment, to prevent the threaded stud from pulling out of the legs during tightening, the head of the threaded stud may be fixed between two or more layers of leg material. This construction may trap the threaded stud head to prevent it from moving away from the end of the leg and may also prevent the threaded stud head from being pulled through the end of the leg during the tightening of the leg to the sub-frame. In addition, the two or more layers of leg material may provide for added strength to the sub-frame 112 legs to prevent distortion at the sub-frame 112 and leg interface. In an example of a fixed torso section, the sub-frame 112 may provide a base to solidly connect the torso section to provide a fixed non-moving section. The other moveable sections may be moveably connected to the fixed torso section and additionally supported by the sub-frame 112 using a moveable interface connection.

In an embodiment, the sub-frame 112 may have structural members that may run along the length of the adjustable bed facility 102, run along the width of the adjustable bed facility 102, run diagonally across the adjustable bed facility 102, or other orientation in relation to the adjustable bed facility 102 that may be required for support or connection to components.

In an embodiment, the skeleton structure 114 may be used as an RF antenna for receiving communication from the remote 148. In embodiment, the entire skeleton structure 114 may be used as an antenna; a portion of the skeleton structure 114 may be used as an antenna, or the like.

In one embodiment, the sub-frame 112 may provide solid connections for any fixed section and skeleton structure 114 by rigidly connecting the skeleton structure 114 directly to the sub-frame 112. In this manner, any fixed section and skeleton structure 114 may be rigidly connected to the sub-frame 112, and through the sub-frame 112, rigidly connected to the floor.

In another embodiment, the sub-frame 112 may provide an interface for the fixed adjustable bed facility 102 section and skeleton structure 114 where the fixed section may be able to move or slide in relation to the sub-frame 112. By providing a non-rigid interface connection between the sub-frame 112 and the skeleton structure 114, the fixed adjustable bed facility 102 section may have a freedom of motion but still may be supported by the sub-frame in a solid foundation manner. For example, the fixed adjustable bed facility 102 section may have wheels that run in a track, groove, "C" channel, or the like of the sub-frame 112 and may be able to move horizontally during the motion of one or more of the movable adjustable bed facility 102 sections. In an embodiment, the horizontal freedom of motion may provide for a "wall hugger" feature where, as the head section is adjusted up or down, the fixed torso section may move, along with the head section, horizontally forward and away from an adjacent wall to maintain a fixed distance between the head section and the wall, therefore "hugging" the wall. It may be understood by one skilled in the art that the moveable interface between the skeleton structure 114 and sub-frame 112 may be any type of interface that may allow freedom of motion between the sub-frame 112 and skeleton structure 114.

In an embodiment, any adjustable sections may have two connections, a first connection may be provided by a hinge type connection and a second connection may be the connection with the actuator 104 and safety bracket 122 that may provide the force to rotate the adjustable bed facility 102 section up or down. In an embodiment, the hinge type connection between the skeleton structure 114 of a first section and a second section may provide the point of rotation for the section motion. In an embodiment, the adjustable bed facility 102 may contain more than one section and any or all of the sections may be connected by a hinge type connection.

In an embodiment, there may be a support gusset for connection between the actuator 104 and the adjustable bed facility 102 section. In embodiments, the gusset may be an I beam, a T beam, an L beam, a box beam, or any other beam design that may provide the strength to lift the combined weight of the adjustable bed facility 102 section and the user without bending. In an embodiment, to resist bending forces at the connections to the actuator 104 and the adjustable bed facility 102 section, the ends of the gusset may be reinforced. In embodiments, the reinforcement may be an additional bracket added to the ends of the gusset, such as a U bracket or other bracket shape, to provide for increased material thickness and strength of the gusset ends. The thickness of the additional bracket may be determined by the amount of force and torque that may need to be resisted during the adjustable bed facility 102 section movement.

With the adjustable bed facility 102 sections interconnected using hinge type connections there may be at least one actuator 104 that may provide a connection between a fixed adjustable bed facility 102 section and a moveable section. In an embodiment, the hinge connection between the adjustable bed facility 102 sections may be a pivot point bracket that may include additional strengthening to resist bending forces. Similar to the gusset described above, the pivot point connections may have additional reinforcement, such as a U bracket or other shaped bracket, to provide for increased material thickness and strength to resist bending forces. The thickness of the additional bracket may be determined by the amount of force and torque that may need to be resisted during the adjustable bed facility 102 section movement. In an embodiment, the actuation 104 connection may be between two of the skeleton structures 114. For example, a first end of the actuator 104 may be connected to the fixed torso section of the adjustable bed facility 102 and a second end of the actuator 104 may be connected to the section that is to be moved (e.g. head, leg, or foot sections). In an embodiment, the actuator 104 may use electric motors and mechanical gears, pneumatic pressure, hydraulic pressure, pneumatic spring, air spring, hydraulic spring or the like to provide the force to extend and retract the actuator 104. The action of extending and retracting the actuator 104 may move the various movable bed sections up or down. By the actuator 104 pushing against the section, the section may rotate upward around the pivot point provided by the hinge type connection. In the same manner, by the actuator 104 pulling against the section, the section may rotate downward around the pivot point provided by the hinge type connection. In an embodiment, there may be at least one actuator 114 for every moveable adjustable bed facility 102 section.

In an embodiment, the combination of actuator 114, safety bracket 122, and supports 120 may provide a safety feature to prevent an object that may be under the adjustable bed facility 102 from being damaged, impinged, crushed, or the like during the decent of the adjustable bed facility 102 section. During the downward motion of one adjustable bed facility 102 sections, the section may come in contact with an object that is under the adjustable bed facility 102. If the actuator 104 is allowed to continue to pull the section in the downward direction, the object may be crushed under the force the actuator 104 may apply. In an embodiment, the safety bracket 122 may have a slot that may provide time to determine that there is an object under the section that is moving downward.

In an embodiment, the slot may have a first side that is on the opposite side of the slot from the actuator 104 and a second side that is on the same side as the actuator 104. In an embodiment, the slot that is between the first side and the second side may be of any length. In an embodiment, the actuator may push against the first side to move the adjustable bed facility 102 section in an upward direction. In an embodiment, during the downward motion of the section, the actuator 104 may move at the same speed as the adjustable bed facility 102 section and therefore the actuator connection to the safety bracket 122 may remain within the safety bracket 122 slot without contacting either the first or second sides of the slot. In an embodiment, the section may move in the downward direction under the weight of the section without the actuator 104 pulling on the second side of the safety bracket 122.

In an embodiment, the adjustable bed facility 102 section downward speed may be further controlled by supports 120 that may provide resistance to the section motion to control the rate of decent. In an embodiment, the support 120 may be a pressurized device using pneumatic pressure, hydraulic pressure, or the like to provide a resistive force to slow the decent of the adjustable bed facility 102 section. In an embodiment, the supports may provide enough resistance to control the rate of decent of the section as the actuator 104 is retracted.

In an embodiment, as the actuator 104 retracts, the adjustable bed facility 102 section, with the aid of the support 120, may descend at the same rate as the as the actuator 104 is retracting. By matching the rates of the actuator 104 retraction and the adjustable bed facility 102 section descending, the actuator 104 connection within the safety bracket 122 slot may remain within the slot area and not contact either the first or second side of the slot. In an embodiment, as the section descends, if an object is encountered, the adjustable bed facility 102 section may stop its decent and the actuator 104 connection will move within the safety bracket 122 slot without pulling the section downward. In an embodiment, the amount of time that the actuator 104 connection is moving within the safety bracket 122 slot while the adjustable bed facility 102 section is stopped may provide time to the user to realize that an object has been contacted and to stop the downward motion of the section.

In an embodiment, an additional safety feature may be the addition of a shut off sensor, shut off switch, or the like on the first side of the safety bracket 122 slot to stop the retraction of the actuator 104 if the actuator 104 connection comes in contact with the first side of the slot. In this manner, if the actuator 104 connection with the safety bracket 122 slot reaches the first side of the slot, the actuator 104 retraction may be stopped and the adjustable bed facility 102 section will not be forcibly pulled down into the object that may be under the section. In an embodiment, there may be an indication to the user that the actuator 104 connection has come in contact with the first side of the slot and the adjustable bed facility 102 sections downward motion has been stopped. In an embodiment, the indication may be an audio indication, a visual indication, a motion indication (e.g. vibration), or the like to indicate to the user that the motion has been stopped and there may be an obstruction with the adjustable bed facility 102 section.

In an embodiment, there may be at least one vibration motor 118 that may provide vibration and massage functions to the adjustable bed facility 102 sections and mattresses 110. In an embodiment, there may be vibration motors 118 associated with any of the adjustable bed facility 102 sections. In an embodiment there may be more than one vibration motor 118 for each adjustable bed facility 102 section that may have vibration motors 118. In an embodiment, using the remote 148, the user may be able to control the vibration mode of the various vibration motors 118; the mode may include the vibration setting for a particular bed section, the vibration frequency of at least one of the vibration motors, stopping the vibration of at least one of the vibration motors, or the like. In an embodiment, the vibration motors 118 may be operated independently or in combination. In an embodiment, the user may select a vibration mode on the remote 148 and the control box 134 may use a software application to control the various vibration motors 118 to the user's request.

Figure 5A:
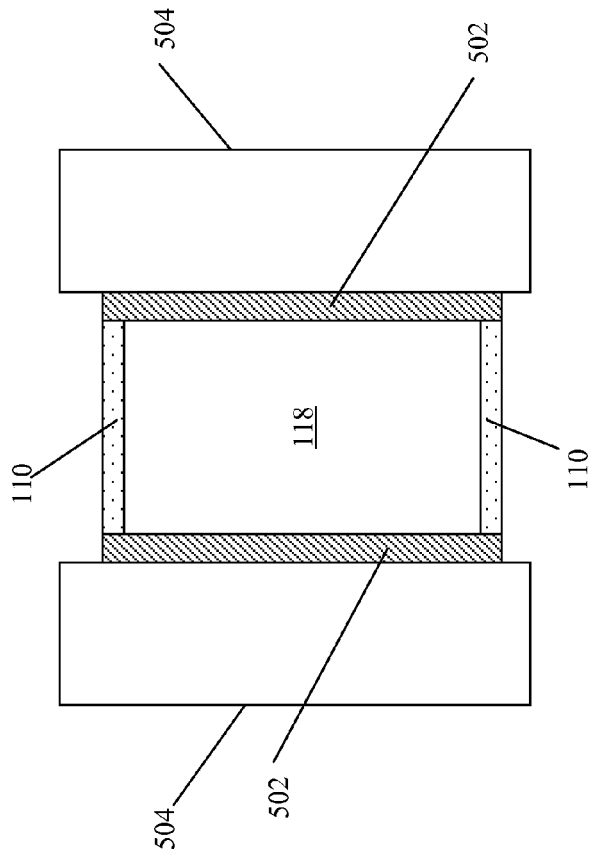
FIG. 5A shows a top view of a vibration motor within an opening of a adjustable bed facility section lateral surface.
Figure 5B:
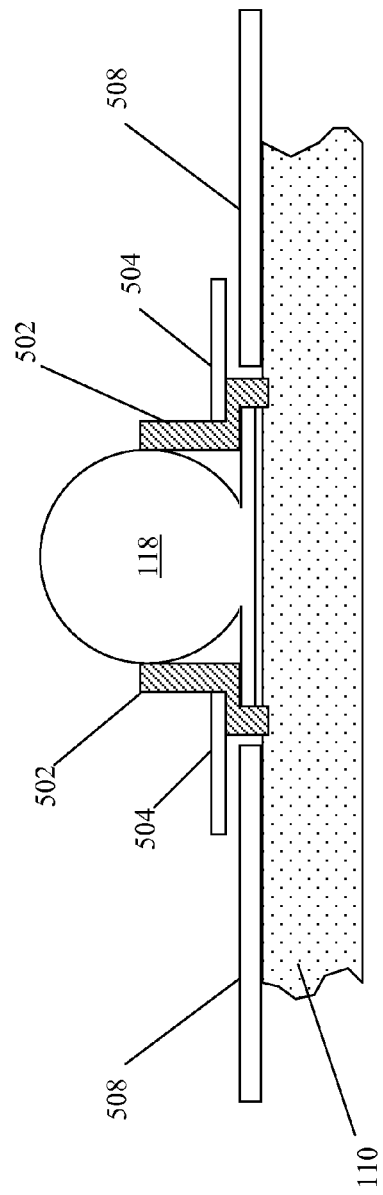
FIG. 5B shows a side view of a vibration motor within an opening of an adjustable bed facility lateral surface.

In an embodiment, the vibration motor 118 may be an electric/mechanical device, a pneumatic device, a hydraulic device, or the like. The mechanical device may use an electric motor to rotate an offset mass to create a vibration; the vibration motor may be controlled for vibration frequency and amplitude by the speed of rotation of the electric motor. Referring to FIG. 5A and FIG. 5B, an embodiment of a vibration motor 118 is shown within an opening of a adjustable bed facility 102 support lateral surface 508. The adjustable bed facility 102 section may have a lateral surface 508 and the lateral surface 508 may include an opening in which the vibration motor 118 may be located; the vibration motor 118 may fit within the opening such that the vibration motor 118 may not contact the lateral surface 508.

In an embodiment, the vibration motor 118 may be secured to the adjustable bed facility 102 section using at least one bracket 504. In an embodiment, when more than one bracket 504 is used, at least one of the brackets 504 may be separable and removable. In an embodiment, the at least one bracket 504 may be shaped to secure the vibration motor 118 within the section opening such as a straight bracket, a U shaped bracket, an L shaped bracket, or the like; in FIG. 5A and FIG. 5B the bracket 504 is shown as a straight bracket 504. In an embodiment, the removal of one of the brackets 504 may facilitate securing the vibration motor 118 to the bed section, facilitating the servicing of the vibration motor 118, or the like. The bracket 504 may be positioned such that at least one portion of the bracket 504 is within the opening of the lateral surface 508 and may also be positioned such that the bracket 504 may overlap the vibration motor 118 flange. The bracket 504 may provide support to the vibration motor 118 flange along a majority of the perimeter of the mattress support opening. The bracket 504 may be coupled to the mattress support 508 using a removable coupling. Removing the bracket 504 may facilitate removing and servicing the vibration motor 118. The vibration motor 118 flange may extend beyond the perimeter of the opening of the mattress support 508 and the resilient material 502 may provide positional support for the motor so that the flange may impart vibration to the mattress without contacting the mattress support. The resilient material 502 may provide mechanical insulation between the flange and the perimeter of the opening in the mattress support 508. The resilient material 502 disposed between the flange and the lateral support 508 surface of the bracket 504 may further provide positional support for the vibration motor 118 housing.

The bracket 504 may be constructed using material such as plastic, metal, or the like, and may be constructed using the materials individually or in combination. In an embodiment, there may be a resilient material 502 associated with the brackets 504, the resilient material may provide for dampening the vibration between the vibration motor 118 and the adjustable bed facility 102, may contact the vibration motor 118 to secure the vibration motor 118 to the bed section, may provide for dampening of vibration to the adjustable bed facility 102 and hold the vibration motor 118 in place, or the like. The resilient material 502 may include latex foam, polyurethane foam, polypropylene foam, polyethylene foam, or the like and may be used individually or in combination.

In an embodiment, either of the pneumatic or hydraulic devices may act as a vibration motor 118 increasing and decreasing the pressure within a cylinder, bladder, or the like at certain frequencies to provide the vibration required by the user. In an embodiment, a device to provide the pressure frequency may be part of the vibration motor 118, a separate device from the vibration motor 118, or the like.

In an embodiment, the vibration facility 118 may be connected to the skeleton structure 114, the mattress 110, the lateral surface 508, or the like where the vibration may be imparted into the adjustable bed facility 102 mattress 110 as desired by the user. In an embodiment, the vibration motor 118 flange may provide surface area that may impart a vibration into the mattress 110. In another embodiment, the vibration motor 118 may be in proximity to a vibration distribution facility (not shown) that may aid in the propagation of vibration energy to the adjustable bed facility 102 section. In an embodiment, the vibration motor 118 may be operatively connected to the vibration distribution facility, may be in contact with the vibration distribution facility, may not be in contact with the vibration distribution facility, or the like. The vibration distribution facility may be constructed using materials such as plastic, rubber, metal, or the like and may be constructed using these materials individually or in combination. In an embodiment, the vibration distribution facility may provide for a more uniform distribution of the vibration characteristics of the vibration motor 118 and may have a size and shape relative to the size and shape of the adjustable bed facility 102 section.

Referring again to FIG. 1, in an embodiment, the adjustable bed facility 102 may have an electronic facility 124 that may contain components that provide control of the physical aspects of the adjustable bed facility 102 (e.g. actuator, vibration motors), interface with the remote 148, interface with networks, interface with bed memory 154, control electronic devices of the adjustable bed facility 102, and the like.

In an embodiment, the control box 134 may coordinate the electronic requirements of the electronic facility 124. In an embodiment, the control box 134 may interface with the receiver 130, remote 148, air purification facility 144, power outlets, power connection 142, power supply 140, modular controls 132, wire harness 128, and the like. In an embodiment, the control box 134, receiver 130, and power supply 140 may be mounted directly to the skeleton structure 114.

In an embodiment, the control box 134 may receive its command request from the user requesting adjustable bed facility 102 functions using the remote 148. In an embodiment, the remote may communicate to the receiver 130 and the receiver may transmit the received user command request to the control box 134. In an embodiment, the receiver 130 and control box 134 may be individual devices or a combined device.

In an embodiment, the remote 148 and receiver 130 may have wired or wireless communication. In an embodiment, the wireless communication may be by radio frequency (RF), infrared (IR), Bluetooth, or the like. In an embodiment, the receiver 130 may receive the user commands from the remote 130 and transmit the same command to the control box 134; the receiver may not provide any interpretation of the remote 148 commands. In an embodiment, the remote 148 and receiver 130 may be communication matched by the use of a code key. The code key may be any indicator that may be interpreted by the remote 148 and receiver 130 that commands may be received and executed between the remote 148 and receiver 130. In embodiments, the code key may be a number, a word, a serial number, a bed identification, a remote identification, a user identification, or any other identification known to both the remote 148 and receiver 130, all an indication that communications should be received. The code key may be transmitted as the beginning of the communication, the end of the communication, as part of the communication or the like.

In an embodiment, the skeleton structure 114 may be used as an RF antenna for receiving communication from the remote 148 to the receiver 130. In embodiment, the entire skeleton structure 114 may be used as an antenna; a portion of the skeleton structure 114 may be used as an antenna, or the like.

In an embodiment, the control box 134 may also control the functions of the adjustable bed facility 102 using a wireless technology in place of, or in coordination with, the wire harness 128. In an embodiment, the wireless technology may include Bluetooth, ultra-wideband (UWB), wireless USB (WUSB), IEEE 802.11, cellular, or the like. The various controlled functions (e.g. actuators 104 or external devices) may be able to communicate using the wireless technology, may use an intermediate wireless receiver, or the like to communicate with the control box 134.

In an embodiment, the control box 134 wireless communication may use a wireless network protocol that may include peer-to-peer communication, master/slave communication, as a hub, as a server, or the like. In an embodiment, the wireless communication may be used to control more than one adjustable bed facility. For example, the user may be able to control his/her adjustable bed facility and may additionally be able to control another adjustable bed that may be within the range of the communication method.

In an embodiment, the cellular communication may utilize a cell phone, a smart phone, or the like to provide the communication method with the control box 134, modular controls 132, or the like. In an embodiment, the control box 134 may be controlled by a programmable control circuit (PLC). In an embodiment, the user may use a menu on the cell phone for adjustable bed functions that may be controlled by the cell phone. For example, the cell phone technology may be able to control the bed position and vibration characteristics of the adjustable bed facility 102 and therefore the cell phone menu may present the user with options for controlling the bed position and vibration.

In an embodiment, if the communication between the remote 148 and receiver 130 is wireless, the receiver learn facility 152 may be used to establish the communication between them. In an embodiment, a learn protocol between the remote 148 and receiver 130 may be user initiated by pressing a button on the receiver learn facility 152, powering up the receiver learn facility 152, bringing the receiver learn facility 152 within a certain proximity of the receiver 130, indicating on the remote 152 to begin the learn protocol, or the like. In an embodiment, the learn protocol may be fully automatic, semi-automatic with user intervention, manual, or the like. In an embodiment, a user may select a channel, frequency, or the like during learn protocol or after the learn protocol. The changing of the channel, frequency, or the like may prevent two different remote 148 and receiver 130 combinations from interfering with other wireless communication devices. In an embodiment, each time the learn protocol is executed, a new unique communication link may be established; there may be a plurality of unique communication links available for each remote 148 and receiver 130 combination.

In an embodiment, the remote 148 may be a user controlled device to provide control commands to the control box 134 to command certain functions of the adjustable bed facility 102. In an embodiment, the certain functions may be adjustable bed facility section movement (e.g. up or down), vibration control, modular controlled 132 devices, or the like. In an embodiment, the remote 148 may communicate with the control box using wired communication, wireless communication, or the like. In an embodiment, the wireless communication may use a radio frequency (RF), infrared (IR), Bluetooth, or the like. If the remote communicates using a wireless technology, the communication may be with the receiver 130 and the receiver 130 may pass the command request to the control box 134.

Figure 3:
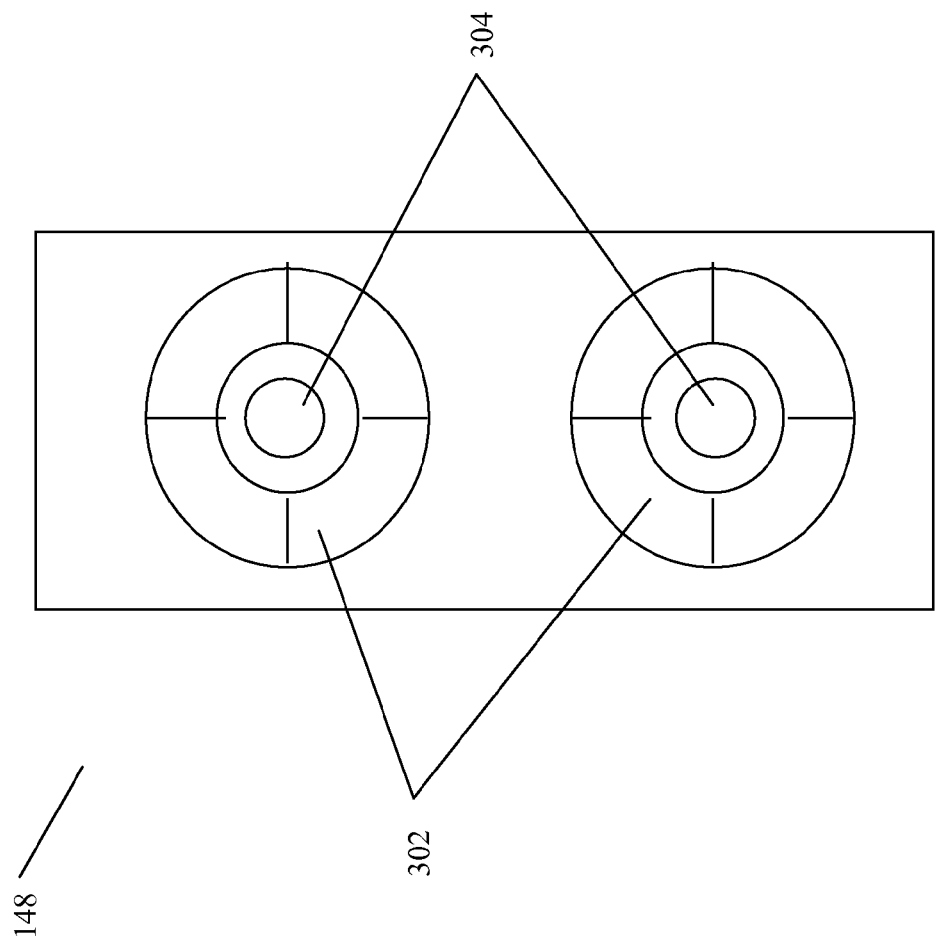
FIG. 3 shows an embodiment of a remote control used to command the adjustable bed facility.

In an embodiment, the inputs of the remote control 148 may be organized into groups of common function control; the remote control 148 groups may be arranged in a circular orientation. As shown in FIG. 3, the remote control 148 may include more than one group 302 and may include at least one positioning control group and one vibration control group. In one embodiment, the remote control 148 groups 302 may be organized into a circular pattern where the circular pattern may provide for inputs that control increasing a function, decreasing a function, storing a function, global command functions 304, or the like. For example, a circular group 302 may be divided up into a number of segments to control certain functions of the adjustable bed facility 102. FIG. 3 shows four sections for each of the circular groups 302, but it should be understood that there may be any number of sections to provide the required adjustable bed facility 102 control.

In one example, one of the circular groups 302 may be used to control movements of the adjustable bed facility 102 sections. The movement circular group 302 may have inputs for moving the head section up/down, moving the foot section up/down, inputs for storing a user preferred positions to the PLC, or the like. Additionally, there may be a global command input 304 that may provide for commanding more than one adjustable bed facility 102 function using a single input such as commanding the adjustable bed facility 102 to go to a flat position. For example, the user may be able to select the flat button and the adjustable bed facility 102 may move all of the adjustable sections to the flat position.

A vibration circular group 302 may have inputs for controlling the vibration of the head section up/down, controlling the foot section vibration up/down, inputs for storing a user preferred vibration characteristics to the PLC, or the like. Additionally, there may be a global command input 304 that may provide for commanding more than one adjustable bed facility 102 vibration characteristic using a single input such as commanding the adjustable bed facility 102 to stop all vibration. For example, the user may be able to select the stop vibration input and the adjustable bed facility 102 may stop all of the adjustable sections from vibrating. In an embodiment, the user may select the all stop global 304 input to stop the adjustable bed facility 102 vibration before selecting a different vibration characteristic for one of the adjustable bed facility 102 sections.

In an embodiment, the user may be able to determine the control functions that the global command 304 may control. For example, the user may be able to input a command sequence to indicate the global command that should be applied to the global command 304 input. In an embodiment, the global command may be stored in the adjustable bed facility 102 memory 154 for later recall. In an embodiment, after the global command 304 has been stored, the user may select the global command 304 input for the command sequence execution.

The function of the remote 148 has been described with controlling adjustable bed facility 102 movement and vibration, but it should be understood that the remote may have control inputs for any function of the adjustable bed facility 102. Additionally, the control inputs have been described as having a circular pattern, but it should be understood that other embodiments of the control input organization may be used for controlling the function of the adjustable bed facility 102.

The remote 148 may include a timer that has a user defined setting that may allow the user to determine when the remote 148 communicates a control command to the adjustable bed facility. For example, the user may be able to set a timer on the remote 148 to indicate a time when the adjustable bed facility 102 is to go to a flat position. The user may use this function in the evening where the user may want to read for a half hour and then go to sleep, the user could set the timer for a half hour and the adjustable bed facility 102 may go to the flat position after the half hour. In another embodiment, the timer may be a clock where the user may be able to set a time when the adjustable bed facility 102 is to complete a certain function. In an embodiment, the user may be able to indicate the command that the remote 148 is to transmit to the adjustable bed facility 102 when the timer or clock setting indication has been reached.

In an embodiment, the remote 148 may be able to directly control the settings of external power outlets associated with the adjustable bed facility 148. The power outlet may be an RF controlled power outlet and the remote 148 may be able to transmit an RF command directly to the RF power outlet. In an embodiment, the power outlet may include settings of at least on, off, a percentage of power, or the like. The power outlet control power setting may be controlled by a hardware setting, a software setting, or the like. The power outlet may be an AC powered power outlet or a DC powered power outlet.

The remote 148 may include a timer that has a user defined setting that may allow the user to determine when the remote 148 communicates a control command to the RF power outlet. For example, the user may be able to set a timer on the remote 148 to indicate a time when the RF power outlet is to turn on or off. For example, the user may use this function in the evening where the user may want to read for a half hour and then go to sleep, the user could set the timer for a half hour to turn off a power outlet that controls a light fixture, after the half hour the remote 148 may command the RF power outlet to turn off and therefore turn the light fixture off. In another embodiment, the timer may be a clock where the user may be able to set a time when the RF power outlet may turn on or off. In an embodiment, the user may be able to indicate the command, such as on or off, that the remote 148 is to transmit to the RF power outlet when the timer or clock setting indication has been reached.

In an embodiment, the user may indicate adjustable bed facility 102 functions using the remote 148 by pressing a button, touching a screen, entering a code, speaking a command, or the like. In an embodiment, the control box 134, using the receiver 130, may receive and interpret the command provided by the remote 148. The remote may control devices with commands that may include on, off, high power, medium power, low power, volume, play, fast forward, rewind, skip, modular device to control, or the like. For example, the remote 148 may transmit a command to move the head section up and the control box 134 may command the actuator 104 to extend a certain amount in response to the command. In another example, the remote 148 may command that a modular control 132 connected lamp be turned off. The control box 134 may command the control box 132 to turn off the lamp.

Referring again to FIG. 1, in an embodiment, the control box 124 may use the bed memory 154 to store adjustable bed facility 102 settings, application software, demonstration software, and the like. In an embodiment, the user may determine that certain adjustable bed locations are preferred and should be saved for future recall. The control box 134 may save the user preferred settings in the bed memory 154 in order to recall the preferred settings at the use request. In an embodiment, the control box 134 may also store non-user requested information to the bed memory 154 as needed for the control of the various adjustable bed facility 102 components. For example, when the user requests an adjustable bed facility 102 section to move, the control box 134 may store the last position into bed memory 154 to be used as a last position recall, an undo command, the last settings for all the adjustable bed facility 102 component at shutdown, or the like.

In an embodiment, the control box 134 application software may be stored in the bed memory 154. In an embodiment, the software may be downloaded to the control box 134, may be run from the bed memory 154, or the like. In an embodiment, the application software may be an interrupt type application, a polling type application, or the like for sensing what command the user may have indicated on the remote 148. For example, in an interrupt application, each command requested by the remote 148 may send an interrupt code to the control box 134. The control box 134 may then request from the application software the command sequence that is associated with the received interrupt. In another example, the polling application may continually poll the remote 148 for requested user commands and when a user command is detected, then request the command sequences for the requested user command.

In another embodiment, the control box 134 may use programmable logic circuits (PLC) to store application programs for control of the adjustable bed facility components. In an embodiment, the PLC may be part of the control box 134, part of a bed memory 154, in a separate control box, or the like. In an embodiment, the PLC may include a microcomputer, a microprocessor, volatile memory, non-volatile memory, IO connection to components, or the like. The PLC may provide an interface to permit software application updates to the PLC memory; PLC memory may be over written. In an embodiment, this may provide a method and system for providing software application upgrades to the adjustable bed facility 102.

In an embodiment, the PLC may have a connection to an external interface that may allow updates to be downloaded to the PLC. The connection may be a serial connection, a USB connection, a USB device, a parallel connection, a wireless connection, a bed memory 154, or the like. The capability to download information to the PLC may allow for software updates to the PLC, may allow for remote 148 interface updates to the PLC, may allow memory updates to the PLC, or the like. For example, if the user was supplied with a new or upgraded remote 148, the user may also be supplied with updated software for the PLC. The user may be able to connect the device containing the new software to the external interface and download the new software to the PLC.

In an embodiment, the PLC may have a connection interface with the modular controls 132 to provide the user with control over other devices that may be connected to the adjustable bed facility 102. The PLC may receive commands from the remote 148 for the modular controls 132 and may pass the command through to the modular control 132, may interpret the remote 148 command and command the modular control 132, or the like.

In an embodiment, the PLC may interface with a modular control 132 that is associated with external power outlets. In this embodiment, the user may be able to control the setting of the external power outlet by selecting a setting on the remote 148. The setting on the remote 148 may be received by the receiver 130 and PLC within the control box 134 to set the power outlet setting. For example, the user may be able to turn on the external power outlet by selecting an external outlet on input on the remote. This may result in the external outlet power being turned on to power an attached device such as a lamp.

In an embodiment, the bed memory 154 may be part of the PLC, external from the PLC, a combination of internal and external memory from the PLC, or the like.

In an embodiment, the bed memory 154 may be separate from the control box 134 and the PLC. In an embodiment, the bed memory 154 may be removable memory, the bed memory 154 may be moved from a first adjustable bed facility 102 to a second bed facility 102 to move user settings from the first adjustable bed facility 102 to the second bed facility 102. For example, a user in a care facility may be moved from a first adjustable bed facility 102 to a second adjustable bed facility 102 but the user may have already determined and saved at least one preferred setting to the bed memory 154. The bed memory may be removed from the first adjustable bed facility 102 and moved to the second adjustable bed facility 102 with the user and therefore the user may keep the same preferred adjustable bed 102 settings.

In this manner the bed memory 154 may be considered portable memory. In an embodiment, the removable bed memory 154 may be flash memory, programmable logic circuit (PLC), secure digital (SD) memory, mini SD memory, Compact Flash type I memory, Compact Flash type II memory, Memory Stick, Multimedia Card, xD Picture card, Smartmedia, eXtreme Digital, Microdrive, or the like.

In an embodiment, the bed memory 154 may be part of the remote 148. As part of the communication between the remote 148, receiver 130, and control box 134 memory information may be exchanged between the remote 148 and control box 134. For example, the user may indicate that a certain adjustable bed facility 102 position should be maintained for future recall. The control box 134 may receive the save position request from the remote 148 and transmit the position information back to the remote 148 for storage within the bed storage 154. In a like manner, when the user requests the recall of a previously saved position, the control box 134 may request the position information from the remote 148 bed memory 154.

In an embodiment, if the remote 148 is wireless, the remote 148 may contain both a transmitter and receiver, or a transceiver, to transmit and receive information with the control box 134. In an embodiment, the remote 148 may communicate with the receiver 130 using a connection key. The connection key may be a code that indicates that a certain remote is associated with a certain adjustable bed facility 102. When the remote 148 transmits information to the receiver, the remote may first send a key code to indicate that the remote 148 is associated with the adjustable bed facility 102. If the key code matches the key that the receiver 130 is listening for, the receiver 130 may receive the command from the remote.

Figure 2:
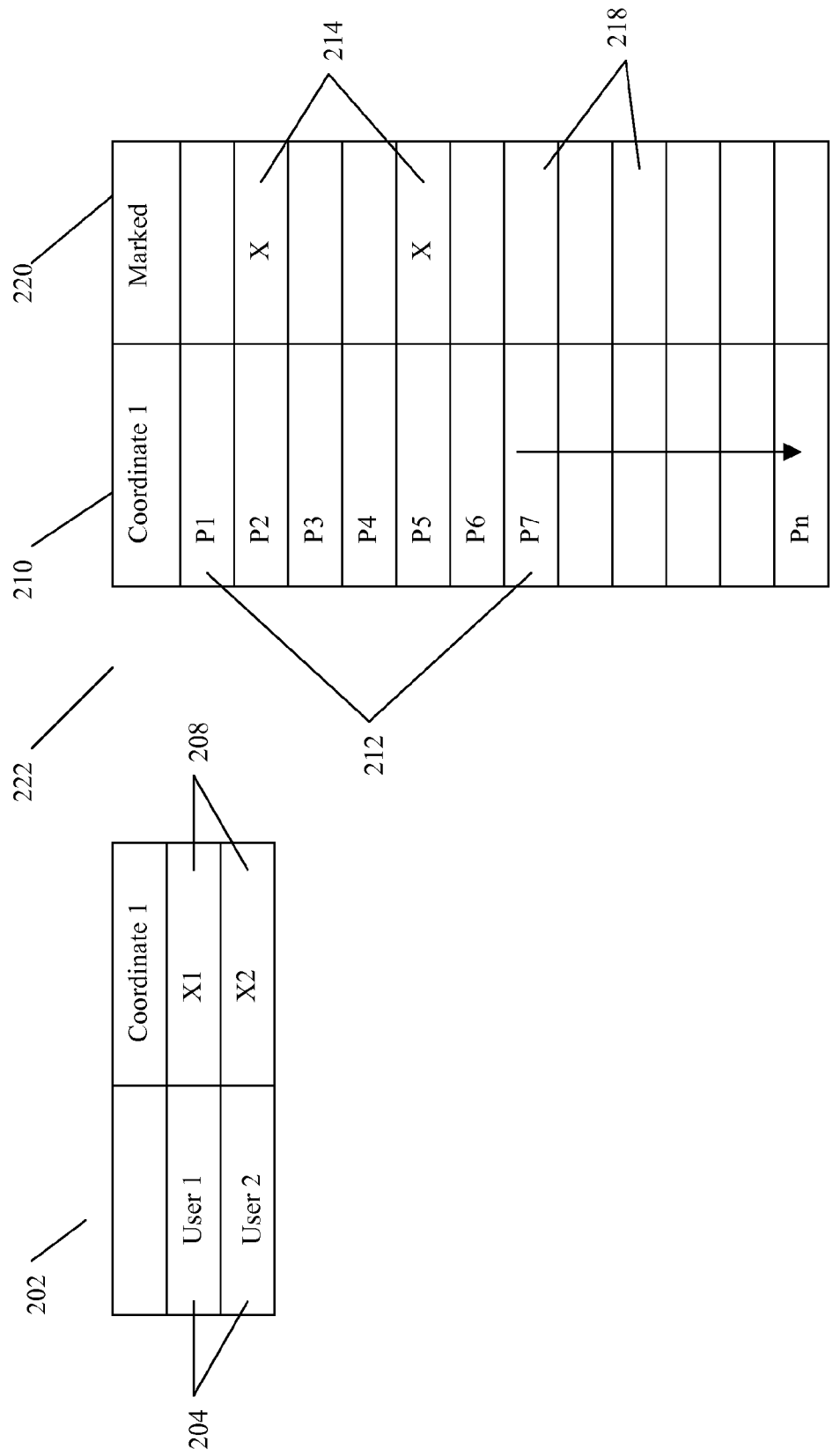
FIG. 2 shows an embodiment of two methods of maintaining user memory for storing user preferred adjustable bed positions.

In an embodiment, the bed memory 154 may maintain the position information for the user preferred positions of the adjustable bed facility 102 sections. In an embodiment, the bed memory 154 may be implemented as a programmable logic circuit (PLC), a logic circuit (LC), or the like. FIG. 2 shows an embodiment of two methods of maintaining the user preferred positions in memory. In an embodiment, a first method may be to have discreet memory table 202 for each preferred user bed position 204. There may be the same number of preferred bed positions 204 and memory locations 208 as indicators on the user remote 148. For example, the remote may have two buttons for the user to set the preferred positions that may be used for later recall; the two buttons may be associated with two discreet memory locations 208. In an embodiment, each time the user indicates a new preferred position for a button on the remote 148 the memory location 208 may be over written with the new position information. In an embodiment, this method may only allow the user to set one user preferred position for every button on the remote 148.

In an embodiment, a second method of memory storage for user preferred adjustable bed positions may be a table 222 that may have a plurality of possible positions 212 the user may select. In an embodiment, as shown, the possible positions 212 may be P1 through Pn. In an embodiment, the possible positions 212 may be a plurality of values that may define the range of available positions for the adjustable bed facility 12; the plurality of values may be a set of values that define the range of available positions for one or more adjustable bed facility 102 functions. For example, the available positions 212 may be a set of increments of section positions that may include a set of actuator 104 positions, a set of actuator 104 activation times, bed section rotation angles, or the like. The set of increments may be determined from a base value for the section. For example, the increments may start at zero from the flat position for the adjustable bed facility 102 section. In an embodiment, the user may be able to select the increment set to be used as possible positions 212 for the section. For example, the user may be able to select the type of graduations by selecting from a set of possible graduation methods such as distance, angle of rotation, actuation time, or the like.

In FIG. 2, the table 222 is shown with an increment column 210 and an indication column 220. In an embodiment, the table 222 may have a plurality of columns 220 to store position information for any of the adjustable aspects of the adjustable bed facility 102. For example, there may be an indication column 220 for the head section angle, the foot angle section, the vibration characteristics for the various vibration motors of the adjustable bed facility 102, or the like. In another embodiment, the adjustable aspects of the adjustable bed facility 102 may be represented by a plurality of individual tables 210 for storing indication information for each of the individual adjustable attributes for the adjustable bed facility 102. The individual tables 210 may be substantially the same as the table 222 shown in FIG. 2 where there may be one column 210 for increments 212 and another column 220 for indication information (214 and 218). For example, there may be individual tables 210 for the head section angle, foot section angle, vibration motor characteristics, or the like. In an embodiment, the PLC may be able to access the adjustable bed facility 102 settings by accessing large tables 210 that contain many columns, small tables 210 that contain a few columns, a combination of large and small tables 210, or the like.

In an embodiment, the PLC may store the tables 210 within the PLC memory for accessing the settings of the adjustable bed facility 102. In another embodiment, the table 222 may be stored in memory outside of the PLC and the PLC may access the table 222 through an interface connection. The table 222 increment column 210 may represent a plurality of available positions associated with adjustable bed facility functions. In an embodiment, the increment values may be a measurement scale (e.g. inches or angle), may be the number of rotations of the actuator, the vibration frequency of the vibration motor, or other increment scale. In response to a user input, the indication column 220 may be marked with the indication 214 to represent the position intended by the user. When the user makes a request to save a position, the PLC may search the increment column 210 to determine which of the plurality of increments 212 represents the current position value of the adjustable bed facility 102 section. Once the current position value increment 212 within the table 222 is determined, an indication 214 may be stored to the indication column 220 associated to the current position value increment 212. In an embodiment, the indication 214 may be any character that may represent a position being selected such as a letter, a number, special character, or the like. In embodiments, the indication column 220 may include all indications, no indications, one indication, more than one indication, or the like to indicate the user's intended position. The storing of the indication association of the current position value with the user selected position may include adding a store indication to the table 222 entry representing the current position value, removing the current position value from the table 222 of values, removing a plurality of the table 222 values where the removal does not include removing the current position value, adding a store indication to every table 222 entry except a table 222 entry representing the current position value, or the like.

In an embodiment, when a user indicates on the remote 148 that a position is to be saved in the table 222, the PLC may select the increment value 212 from within the increment column 210 set of values that represents the current position of the adjustable bed facility 102. The PLC may store an indication 214 associated with the increment value 212; the stored indication associated with the current position value may be a recall value that may be recalled at a later time to reposition the adjustable bed facility 102.

In an embodiment, in response to the user requesting to return to a recall value, the PLC may scan the table 222 indication column 220 for an indication 214 that may represent the user's recall value. Upon locating the recall value indication 214, the PLC may command the adjustable bed function to the recall value indicated 214 location, position, vibration, or the like.

In an embodiment, the indication column 220 of the table 222 may initially contain indications 214 in all to the available discrete locations 212. As a user indicates that current position value is the position to be stored within the table 222, the indication 214 for the current position value may be removed from the table 222. This may result in one increment location 212 being empty of an indication. In this case, when a user requests to return to the recall position, the PLC may scan the table 222 indication column 220 for the empty increment location 212. Once the empty increment location is found, the PLC may command the adjustable bed function to the recall position, vibration, or other adjustable bed facility 102 function. In an embodiment, if the user stores a different current position value, the empty discrete location 212 may be filled with an indication and the new indication associated to the current position value may have the indication 214 removed. In an embodiment, the user may be able to clear the stored position by indicating a clear command and all of the increment locations 212 may be filled with indications 214.

In an embodiment, the available increment locations 212 in the indication column 220 of the table 222 may initially contain no indications 214 so that the indication column 220 may be empty. As a user indicates that a current position value is the position to be stored within the table 222, the indication 214 associated to the current position value may be added to the table 222. This may result in one increment location 212 having an indication. In this case, when a user requests to return to recall value position, the PLC may scan the table 222 indication column 220 for the increment location 212 containing the indication 214 associated with the recall value. Once the increment location is found, the PLC may command the adjustable bed function to the recall value position, position, vibration, or other adjustable bed facility 102 function. In an embodiment, if the user stores a different position, the increment location 212 indication 214 may be removed and the new current position value may have the indication 214 added. In an embodiment, the user may be able to clear the stored position by indicating a clear command and all of the discrete locations 212 may have the indication 214 removed.

In an embodiment, when a user indicates a current position value is to be indicated in the table 222, the indication may represent the user's preferred adjustable bed facility 102 position. In an embodiment, the user's indicated current position value may be rounded to the closest table 222 increment location 214. For example, if the user selects a current position value that is between two increment positions on the table 222, an algorithm may be used to determine which of the increment positions are to be indicated in the indication column 220.

Embodiments of the present invention involve setting a recall bed position in response to a user making a storage selection. The user's storage selection may send a command to the adjustable bed facility's 102 controller (e.g. the PLC) indicating that the user would like the present position of the adjustable bed facility 102 stored such that the user can later have the adjustable bed facility 102 return to the stored position. The user may use a user interface (e.g. the remote control 148) and make such a storage selection once the adjustable bed facility 102 is in a desired position. As described herein elsewhere, a plurality of position values that define a range of available positions for the adjustable bed facility 102 may be stored in memory accessible by the adjustable bed facility's 102 controller. The available positions may be stored in a table 222 or other structure for example. Once the user initiates such a storage request, the controller may receive the request to save the current adjustable bed facility 102 position as a user selected position. The controller may then make a determination of which of the plurality of position values represent the current position of the adjustable bed facility 102 to provide a current position value. In determining which of the plurality of position values represents the current position, the controller may use an algorithm to decide which of the plurality of values best represents the current adjustable bed facility 102 position. For example, the actual adjustable bed facility 102 position may match one of the values and the algorithm may then select the matching value as the one that best represents the current position. In another situation, the actual adjustable bed facility 102 position may not match any of the plurality of values. In this case an algorithm may be used to determine which value best represents the position of the adjustable bed facility 102. The algorithm may run an averaging calculation, interpolation calculation or other form of prediction algorithm to select between two positions representing positions on either side of the actual adjustable bed facility 102 position, for example. Once the controller has made the determination as to which value represents the current adjustable bed facility 102 position, the controller may then store an association of the current position value with the user-selected position (e.g. as described elsewhere herein).

The embodiment of unmarking 218 preferred positions will be used in the following illustrations, but it should be understood that marking a current position value may also be used as a method of indicating a preferred position 212.

In an embodiment, the user may indicate the current position value by indicating a set position on the remote 148; this indication may result in all of the possible increment locations 212 having an indication 214 except for the one increment the user has selected which may be non-marked 218. For example, if the user selected the P3 position 212 as a preferred position, all of the positions 212 may receive a mark 214 except the one position P3 which may receive a non-mark 218.

In an embodiment, the positioning recall position logic of the adjustable bed may seek possible positions 212 that do not have a mark 218 when determining what user positions to select.

In an embodiment, the user may be able to set more than one increment position 212 in the table 222 for a single button on the remote 148. For example, the user may be able to press a button on the remote 148 in a certain way to set a non-mark 218 at different preferred positions 212. In another example, when the user presses a button on the remote 148, the current position value may be unmarked 218 as a preferred position and an algorithm may be executed to unmark 218 other preferred positions 212 at certain increments from the user selected position. In one example of the algorithm, every $3^{rd}$ position may be selected to be unmarked 218 as a preferred position 212. The additional non-markings 218 may be by actuation time, section rotation angle, or the like. A person skilled in the art may understand that there may be any number of different methods of unmarking more than one position 212 using a single button on the remote 148.

In an embodiment, with user preferred positions 212 unmarked 218 on the table 222, the user may indicate on the remote 148 to recall the user preferred position 212. In an embodiment, there may be an algorithm to search the table 222 for an unmarked 218 user preferred position 212 to position the bed to the recall value. Once the preferred position 212 is determined, the command logic may command the actuator or actuators to move the adjustable bed sections into the preferred position 212 recall value. In an embodiment, there may be more than one preferred position 212 unmarked 218 on the table 222. In this case, the algorithm may seek the first unmarked 218 position 212 and move the adjustable bed section to that position. In an embodiment, if this is not the user desired position, the user may indicate again on the remote to recall a preferred position and the algorithm may seek the next unmarked 218 position 212. A person skilled in the art may understand that there may be a number of different methods of recalling a plurality of marked 214 or unmarked 218 positions 212 from the table 222.

Referring again to FIG. 1, in an embodiment, the removable bed memory 154 may be used to upgrade the adjustable bed facility 102 memory and software. For example, if new control box 134 software was developed to provide better control over one of the adjustable bed facility 102 components, the software may be saved to a new replaceable memory that may replace the existing replaceable memory. In this manner, the software of the adjustable bed facility 102 could be upgraded just by providing the user with a new replaceable memory.

In an embodiment, the removable memory may be used to provide a sales enterprise with adjustable bed facility 102 demonstration software where the enterprise may be able to indicate at least one of a plurality of demonstrations for a user. For example, the user may be interested in how the adjustable bed facility 102 sections may be adjusted and the enterprise may select a demonstration to shows all the section motion available. In an embodiment, before an adjustable bed facility 102 is shipped to a user, the enterprise may remove the demonstration removable memory and replace it with a standard adjustable bed facility 102 bed memory 154.

In an embodiment, the memory connection 160 may be any connection type that provides a connection between the bed memory 154, control box 134, and the like. In an embodiment, the memory connection 160 may be a wired or wireless connection. The wired connection may be a USB connection, a serial connection, parallel connection, or the like. The wireless connection may be by radio frequency (RF), infrared (IR), Bluetooth, or the like. In an embodiment, the memory connection 160 may be in a location that is easy for the user to access the bed memory 154, may be attached to the memory facility 150, may be attached to the control box 134, or the like. In an embodiment, the easy access memory connection may be on the side of the adjustable bed facility 102, on a rail of the adjustable bed facility 102, under the adjustable bed facility 102, or the like.

In an embodiment, the control box 134 may also access a network using a network connection 162. In an embodiment, the network may be a LAN, WAN, Internet, intranet, peer-to-peer, or other network with computer devices that the control box 134 may communicate with. In an embodiment, the network connection 162 may be a wired or wireless connection.

In an embodiment, using the network connection 162, the control box 134 may be able to communicate with the network to periodically check for application software updates. In an embodiment, if an application software update is located, the control box 134 may send the user an email, instant messenger message, phone message, phone call, cell phone message, cell phone call, fax, pager message, or the like to indicate that software updates are available. The user, using the device that received the notice of software update, may send a reply to the control box that the software upgrade should be downloaded, should not be downloaded, or the like.

In an embodiment, an adjustable bed facility 102 enterprise, an adjustable bed facility 102 manufacturer, an adjustable bed facility 102 service enterprise, or the like may send the control box 134 software updates using the network connection 162. In an embodiment, an adjustable bed facility 102 enterprise, an adjustable bed facility 102 manufacturer, an adjustable bed facility 102 service enterprise, or the like may notify the user of available software upgrades for the adjustable bed facility 102 by email, instant messenger message, phone message, phone call, cell phone message, cell phone call, fax, pager message, or the like. The user, using the device that received the notice of software upgrade, may send a reply to the adjustable bed facility 102 enterprise, the adjustable bed facility 102 manufacturer, the adjustable bed facility 102 service enterprise, or the like that the software upgrade should be downloaded, should not be downloaded, or the like.

In an embodiment, the user may access the network connection 162 with the user's own computer device.

In an embodiment, the remote 148 and control box 134 may be able to control other devices that may be connected to modular controls 132. In an embodiment, the modular controls 132 may be similar to the control box by interpreting commands to control a device, but may be unique to the device that is connected to it. In an embodiment, the modular controls 132 may control audio equipment, video equipment, lamps, air purification facilities, outlets, and the like. For example, the modular control 132 may be connected to audio equipment and may contain the command sequences to control the audio equipment based on commands that may be received from the remote 148. It may be obvious to someone in the art that any of the devices that are connected to modular controls 132 may be controlled in the same manner.

In an embodiment, the user may indicate a function to be accessed for a certain device connected to a modular control 132, the control box 134 may receive the request from the remote 148 and pass the command onto the appropriate modular control 132. In an embodiment, the remote 148 may have modular control 132 device functions that the user may select to control a modular control 132 device. For example, the remote 148 may have functions such as play, fast-forward, rewind, skip, pause, and the like for an audio device connected to the modular control 132.

In an embodiment, the modular controls 132 may be connected to the control box 134 and power supply 140 using a wire harness 128. The wire harness 128 may contain power and data connections for all of the possible connection locations for the modular controls 132. For example, if there are six locations on the adjustable bed facility 102 for attaching modular controls 132, the wire harness 128 may have six sets of power and data connections available.

In another embodiment, the wire harness may provide only power to the modular controls 132 and the communication between the modular controls 132 and control box 134 may be wireless that may include radio frequency (RF), infrared (IR), Bluetooth, and the like.

In an embodiment, using the remote 148, the control box 134 may be able to control power outlets 138 to which external devices may be connected; the power outlets may be associated with the adjustable bed facility 102, remote from the adjustable bed facility 102, or the like. In an embodiment, the control box may communicate with the power outlet using wired or wireless communications. In this embodiment, the power outlets 138 may receive power directly from a household outlet, fuse box, circuit box, or the like but the function of the power outlets 138 (e.g. on or off) may be controlled by the control box 134. For example, an external lamp may be connected to the power outlets 138, there may be a selectable control on the remote 148 for the user to turn the power outlet 138 on and off and therefore to turn the lamp on and off. In an embodiment, the power outlets 138 may include a control circuit that is able to control if the power outlet 138 receives power from the household current. In an embodiment, there may be more than one power outlet controlled by the control box 134 and there may be a selection for each of the power outlets 138 on the remote 148.

In an embodiment, the power outlets 138 may be directly controlled by the remote control 148 using radio frequency (RF). The remote control and power outlets may be RF capable for communication within the adjustable bed facility 102. The remote control 148 may be able to directly control the power outlets 138 to turn the power outlets on and off using RF without interfacing with the control box 134.

In an embodiment, the control box 134 may be able to control an external air purification 144 facility; the air purification 144 facility may be directly controlled by the control box using a wired or wireless connection. In an embodiment, the wireless connection may be radio frequency (RF), infrared (IR), Bluetooth, or the like. In an embodiment, the air purification facility 144 may be any type of device or facility that may be capable of improving that air environment in the area of the adjustable bed facility 102. In an embodiment, the air purification facility 144 may be an absorbent type (e.g. carbon), electro-static, HEPA filter, or the like. In an embodiment, absorbent materials may be used in a filter, in the adjustable bed facility 102, in the mattress 110, or the like to absorbed odor, dust, contaminants, or the like from the air environment around the bed, within the bed, or the like. In an embodiment, electro-static or iconic air filters may use negative ions to attract dust, contaminants, and the like from the air. In an embodiment, electro-static materials (e.g. tourmaline) may be used in a filter, in the adjustable bed facility 102, in the mattress 110, or the like to absorbed odor, dust, contaminants, or the like from the air environment around the bed, within the bed, or the like. In an embodiment, HEPA filters are composed of a mat of randomly arranged fibers that are designed to trap at least 99.97% of dust, pollen, mold, bacteria, and any airborne particles with a size of 0.3 micrometers (μm) at 85 liters per minute (Lpm). The HEPA filter may be used in a device, facility, or the like for filtering the air in the area of the adjustable bed facility 102.

In an embodiment, the air purification facility 144 may be part of the adjustable bed facility 102, a freestanding device or facility, or the like. In an embodiment, if the air purification facility 144 is part of the adjustable bed facility 102 the air purification facility 144 may be attached to any part of the adjustable bed facility 102 such as the mattress 110, subframe 112, skeleton structure 114, or the like. In an embodiment, the air purification facility 144 that is attached to the adjustable bed facility 102 may be controlled direct control of the air purification facility 144 device, control using the remote 148, or the like.

In an embodiment, the air purification facility 144 may be a free standing device that may be plugged into a adjustable bed facility 102 power outlet 138 and therefore may be controlled with the remote 148 controlling the on/off condition of the power outlet 138.

In an embodiment, the air purification facility 144 may be a freestanding device that may be connected to an adjustable bed facility 102 modular control 128. The modular control may provide power (AC or DC), control communication, and the like to the air purification facility 114. In an embodiment, the user may be able to control the air purification facility 144 using the remote 148 to control the modular controls 132.

In an embodiment, an adjustable bed facility 102 may be any bed that is capable of adjusting at least one aspect of the bed such as a head section, a foot section, a leg section, a torso section, or the like. In an embodiment, the adjustment may include moving the sections up, down, higher, lower, longer, shorter, and the like. In an embodiment, the section adjustments may also include vibration, massage, and the like. In an embodiment, the adjustable bed facility 102 may include components such as actuators 104, springs 108, a mattress 110, a sub-frame 112, a skeleton structure 114, vibration motors 118, supports 120, safety brackets 122, wire harness 128, receiver 130 modular controls 132, control box 134, power outlets 138, power supply 140, power connection 142, air purification facility 144, remote control 148, receiver learn facility 152, bed memory 154, backup battery 158, memory connection 160, network connection 162, and the like.

In an embodiment, the adjustable bed facility 102 sections may be adjustable by a user, a care giver, a medical person, or the like to provide a comfortable position, a medical required position, a working position, a resting position, or the like. For example, a medical position may be required to have a user's legs elevated to aid in the reduction of swelling and therefore the leg or foot sections may be elevated. In another example, a user with a back condition may need to rest his or her back and may still wish to work, the user may be able to position the adjustable bed facility 102 to provide a comfortable back position that allows the user to work on papers or a computer device.

In an embodiment, the adjustable bed facility 102 may be used in a home, a hospital, a long-term care facility, or the like. The adjustable bed facility 102 may be used by users that may have limited mobility, are restricted to bed rest, require a non-flat sleeping position, and the like.

In an embodiment, actuators 104 may be used to move the adjustable bed facility 102 sections. The actuator 104 may typically be a cylinder device where a first component, under a force, is extendable from second component that may result in the action of moving an object. In an embodiment, there may be more than one actuator 104 per adjustable bed facility 102. There may be an actuator 104 to move any of the adjustable bed facility 102 sections or other aspects of the adjustable bed facility 102. For example, there may be individual actuators for the head section, leg section, foot section, torso section, or the like. In an embodiment, a single actuator may be used to move more than one adjustable bed facility 102 section. For example, one actuator may be used to move the leg and foot sections; the leg and foot sections may be connected by a mechanical structure that may control the orientation of the leg and foot sections during movement. In an embodiment, the actuators 104 may be connected between the adjustable bed facility 102 section to be moved and the sub-frame 112, skeleton structure 114, or the like.

In an embodiment, the actuator 104 may have different driving means to extend and retract the actuator 104 such as an electric motor, pneumatic pressure, hydraulic pressure, or the like.

In an embodiment, the electric motor driven actuator 104 may use a DC or AC motor and gear assembly to extend and retract the actuator 104.

In an embodiment, the pneumatic pressure actuator 104 may use an air source to extend and retract the actuator 104. The air source may be part of the pneumatic actuator 104, may be a separate device, or the like. In an embodiment, the separate air source device may be part of the adjustable bed facility 102 or may be external to the adjustable bed facility 102.

In an embodiment, the hydraulic pressure actuator 104 may use a fluid source to extend and retract the actuator 104. The fluid source may be part of the hydraulic actuator 104, may be a separate device, or the like. In an embodiment, the separate fluid source device may be part of the adjustable bed facility 102 or may be external to the adjustable bed facility 102.

In an embodiment, springs 108 may be used with a mattress 110, instead of a mattress 110, or the like. In an embodiment, the springs may be a standard bed spring system (e.g. coils within a wire framework), individual coil springs, individual foam springs, air springs, or the like. In an embodiment, the individual springs (e.g. coil, foam, or air) may be used to provide variable firmness to provide comfort to the user. For example, the springs 108 may be less firm or firmer in a local area to provide the user with the support that may be required for a body location that is experiencing discomfort (e.g. a hip, shoulder, back, neck).

In an embodiment, the mattress 110 may include foam, feathers, springs 108, material, or the like. In an embodiment the different materials may be used individually or in combination. The mattress may be intended to provide the user with a firmness that provides for the comfort requirements of the user.

In an embodiment, the mattress 110 may be an air mattress. In an embodiment, the air mattress may be constructed using a single chamber, a plurality of chambers, a plurality of individual chambers, a combination of chamber shapes, or the like. In an embodiment, the air mattress 110 may be inflated to various pressures that may provide the user with the desired comfort level. In an embodiment, there may be separate air mattresses 110 for each of the adjustable bed facility 102 sections. For example, there may be separate air mattresses 110 for the head, torso, and foot sections of the adjustable bed facility 102. In an embodiment, the inflation pressure of the individual air mattresses 110 may be different from each other depending on user settings.

In another embodiment of an air mattress 110 with individual chambers, local firmness control may provide local firmness comfort to a user to provide comfort. For example, a user may be recovering from surgery and may require the air mattress 110 to be less firm in a certain area, the user may be able to indicate the area to be less firm and the individual chamber pressures may be adjusted to provide the less firm area. Additionally, while a local area may be provided with a less firm pressures, the remainder of the mattress 110 may have a consistent firmness pressure.

In an embodiment, the sub-frame 112 may be a structural support frame in contact with the floor and may include the floor legs, connections for the actuators 104, connections for the supports 120, support for the skeleton structure 114, and the like. In an embodiment, the sub-frame 112 materials may include wood, metal, plastic, and the like. In an embodiment, the sub-frame 112 may provide a support interface to the skeleton structure 114 and may support the freedom of motion for the skeleton structure 114. For example, the sub-frame 112 may include an interface such as a track, surface, groove, slot, or the like in which the skeleton structure 114 may interface and use as a guide while providing motion support for the various adjustable bed facility 102 sections. In an embodiment, the sub-frame 112 interface may be a "C" channel in which the skeleton structure 114 may have interfacing wheels to move within the "C" channel during the adjustable bed facility 102 section movements.

In an embodiment, the sub-frame 112 may be substantially the same shape as the adjustable bed facility 102 and may have structural members along the length and width of the sub-frame 112. In an embodiment, the structural members may be assembled in any configuration that meets the requirements of supporting the adjustable bed facility 102 and the various devices such as the actuators 104, supports 120, skeleton structure 114, and the like.

In an embodiment, the skeleton structure 114 may be a mechanical structure that may provide support to the springs 108, provide support to the mattress 110, interface with the sub-frame 112, provide a connection to the actuators 104, provide a connection to the supports 120, support the vibration motors 118, and the like. In an embodiment, there may be more than one skeleton structure 114 within the adjustable bed facility 102; there may be a skeleton structure 114 for each adjustable bed facility 102 section. For example, there may be a skeleton structure 114 for the head section, foot section, leg section, torso section, and the like.

In an embodiment, the skeleton structure 114 may be a frame type structure to support at least one mattress 110, provide connectivity between more than one mattress 110, contain a hinge mechanism to allow the motion of a first mattress 110 in relation to a second mattress 110, and the like. The frame structure may be substantially the same shape as the mattress 110 that the skeleton structure 114 is supporting and may have individual structure members at the peripheral edges of the mattress 110 in addition to other individual structural members that may be required for support of mechanical connections, support of the mattress 110, or the like. In an embodiment, the skeleton structure 114 may include materials such as metal, wood, plastic, and the like. The skeleton structure 114 materials may be used individually or in combination.

In an embodiment, the skeleton structure 114 may have an interface facility such as wheels, slides, skids, rails, pivot points, and the like that may interface with the sub-frame 112 support interface. The skeleton structure 114 interface facility may provide for smooth interaction with the sub-frame 112 support interface when the skeleton structure 114 is in motion as a result of actuation from the actuators 104.

In an embodiment, a vibration facility 118 may provide vibration input to the adjustable bed facility 102 sections such as the head section, foot section, leg section, torso section, and the like; there may be vibration facilities in any or all of the adjustable bed facility 102 sections. In an embodiment, the vibration facilities 118 may be operated independently, at the same time, at alternate times, in coordination, or the like. For example, the vibration facilities in the head section and foot section may be operated at the same time to provide a full body massage or the vibration frequencies may operate at alternating times to provide a wave effect of the vibration moving from the head to foot of the adjustable bed facility 102. In another example, the different vibration facilities 118 may be used in concert where the vibration facilities 118 may be vibrated in sequences to create a massaging effect. It may be understood by one knowledgeable in the art that different effects may be created with more than one vibration facility 118.

In an embodiment, using the remote 148, the user may be able to control the vibration mode of the various vibration motors 118; the mode may include the vibration setting for a particular bed section, the vibration frequency of at least one of the vibration motors 118, stopping the vibration of at least one of the vibration motors, or the like. The remote 148 may provide vibration motor 118 control information to the adjustable bed facility 102 control box 134 for control of the vibration characteristics of the adjustable bed facility 102. In an embodiment, the remote 148 may include user inputs that include at least one of head vibration increase, head vibration decrease, foot vibration increase, foot vibration decrease, user preferred vibration settings, vibration stop, or the like.

In an embodiment, the vibration motor 118 may be capable of a plurality of vibration frequencies. For example, the vibration motor 118 may be able to operate on frequencies such as high, medium, low, settings 1-10, or the like. In an embodiment, a first vibration frequency may be stopped before a second vibration frequency is started. In embodiments, the stopping between the first vibration and the second vibration may be automatic and controlled by the logic within the control box 134, may be manually indicated by the user using the remote 148, or the like. As an example of manual input, the vibration motor 118 may be operating on a medium frequency and the user may provide a stop vibration input on the remote 148 to stop the first vibration motor 118 vibration before pressing the low vibration frequency input.

Referring to FIG. 5A and FIG. 5B, an embodiment of a vibration motor 118 is shown within an opening of a adjustable bed facility 102 support lateral surface 508. The adjustable bed facility 102 section may have a lateral surface 508 and the lateral surface 508 may include an opening in which the vibration motor 118 may be located; the vibration motor 118 may fit within the opening such that the vibration motor 118 may not contact the lateral surface 508. In an embodiment, the vibration motor 118 may be secured to the adjustable bed facility 102 section using at least one bracket 504. In an embodiment, when more than one bracket 504 is used, at least one of the brackets 504 may be separable and removable. In an embodiment, the at least one bracket 504 may be shaped to secure the vibration motor 118 within the section opening such as a straight bracket, a U shaped bracket, an L shaped bracket, or the like; in FIG. 5A and FIG. 5B the bracket 504 is shown as a straight bracket 504. In an embodiment, the removal of one of the brackets 504 may facilitate securing the vibration motor 118 to the bed section, facilitating the servicing of the vibration motor 118, or the like. The bracket 504 may be positioned such that at least one portion of the bracket 504 is within the opening of the lateral surface 508 and may also be positioned such that the bracket 504 may overlap the vibration motor 118 flange. The vibration motor 118 flange may extend beyond the perimeter of the opening of the mattress support and the resilient material 502 may provide positional support for the vibration motor 118 so that the flange imparts vibration to the mattress 110 without contacting the mattress support. The at least one bracket 504 may be coupled to the mattress support 508 using a removable coupling. Removing the at least one bracket may facilitate removing and servicing the motor. The resilient material 502 may provide mechanical insulation between the flange and the perimeter of the opening in the mattress support 508. The resilient material 502 disposed between the flange and the lateral support 508 surface of the at least one bracket 504 may further provide positional support for the vibration motor 118 housing. The bracket 504 may be constructed using material such as plastic, metal or the like and may be constructed using the materials individually or in combination. In an embodiment, there may be a resilient material 502 associated with the brackets 504, the resilient material may provide for dampening the vibration between the vibration motor 118 and the adjustable bed facility 102, may contact the vibration motor 118 to secure the vibration motor 118 to the bed section, may provide for dampening of vibration to the adjustable bed facility 102 and hold the vibration motor 118 in place, or the like. The resilient material 502 may include latex foam, polyurethane foam, polypropylene foam, polyethylene foam, or the like and may be used individually or in combination.

In an embodiment, the vibration facility 118 may be connected to the skeleton structure 114, the mattress 110, the lateral surface 508, or the like where the vibration may be imparted into the adjustable bed facility 102 mattress 110 as desired by the user. In an embodiment, the vibration motor 118 flange may provide surface area that may impart a vibration into the mattress 110. In an embodiment, the vibration motor 118 may be secured to the adjustable bed facility 102 section using two separable brackets; at least one of the two separable brackets may be removable. In an embodiment, the removal of one of the brackets may facilitate securing the vibration motor 118 to the bed section, facilitating the servicing of the vibration motor 118, or the like. The bracket may be constructed using a material such as plastic, metal, or the like and may be constructed using the materials individually or in combination. In an embodiment, there may be a resilient material attached to the brackets, the resilient material may provide for a dampening the vibration between the vibration motor 118 and the adjustable bed facility 102, may contact the vibration motor 118 to secure the vibration motor 118 to the bed section, or the like. For example, the brackets may be attached to the adjustable bed facility 102 section with the resilient material making contact with the vibration motor 118 that may be in an opening of the section. The resilient material may provide the force required to hold the vibration motor in place within the section opening and may provide dampening of the vibration to the adjustable bed facility. The resilient material may include latex foam, polyurethane foam, polypropylene foam, polyethylene foam, or the like and may be used individually or in combination.

In an embodiment, the electric motor vibration facility 118 may use DC or AC current to power the motor. In an embodiment, to provide the vibration, the motor may rotate an offset mass on the motor shaft that may cause the vibration facility 118, mattress 110, skeleton structure 114, or the like to vibrate. The user may feel the vibration through the mattress 110, springs 108, or the like.

In an embodiment, an air bladder or air spring may be used to provide a vibration to the adjustable bed facility 102. In an embodiment, the air bladder or air spring air pressure may be varied at a frequency to create a vibration within the vibration facility 118, mattress 110, skeleton structure 114, or the like. In an embodiment, there may be an air supply unit that supplies the frequency varied air pressure to the air bladder or air spring.

In an embodiment, the vibration motor 118 may be in proximity to a vibration distribution facility that may aid in the propagation of vibration energy to the adjustable bed facility 102 section. In an embodiment, the vibration motor 118 may be operatively connected to the vibration distribution facility, may be in contact with the vibration distribution facility, may not be in contact with the vibration distribution facility, or the like. In an embodiment, the vibration distribution facility may provide for a more uniform distribution of the vibration characteristics of the vibration motor 118 and may have a size and shape relative to the size and shape of the adjustable bed facility 102 section. The vibration distribution facility may be constructed using materials such as plastic, rubber, metal, or the like and may be constructed using these materials individually or in combination. In an embodiment, the user may be able to control the speed, amplitude, pulse, and the like of the vibration facility 118 using an interface such as the remote 148.

In an embodiment, the vibrator facility 118 may be mounted to the mattress 110 using the vibration distribution facility, resilient material 502, strong fabric, or the like. In an embodiment, each adjustable bed facility 102 section that includes a vibrator facility 118 may have an opening in the section to accept the vibrator facility 118. In an embodiment, over the opening in the section, a layer of resilient material 502, strong fabric, or the like may be placed. The layer of resilient material 502, strong fabric, or the like may be placed between the vibrator facility 118 and the mattress 110. In an embodiment, the vibrator facility 118 may impart vibrations to a mattress 110 through the resilient material 502 disposed over an opening in an adjustable bed facility 102 section. In an embodiment, a fabric cover may be disposed over the resilient material 502 and/or an adjustable bed facility 102 section, between the vibrator facility 118 and the mattress 110. In embodiments, a plurality of fabric covers may be disposed over the resilient material 502 and/or an adjustable bed facility 102 section to provide stabilization. In an embodiment, the vibrator facility 118 may impart vibrations to a mattress 110 through a resilient material 502 and a fabric or plurality of fabrics covering the resilient material 502 and/or adjustable bed facility 102 section.

In an embodiment, the resilient material 502 may be foam, cotton matting, or the like. In an embodiment, the vibration distribution facility may be plastic, wood, rubber, metal, or the like and may be any size and/or shape that supports the required vibration characteristics. The vibration distribution facility may have a plurality of barbs or other anchoring devices that may be pushed into the resilient material, strong fabric, or the like to secure the vibration distribution facility in place on top of the resilient material, strong fabric, or the like. In an embodiment, the barbs or other anchoring devices may have a number of gripping edges, points, or the like to provide a connection with the resilient material and strong fabric.

In an embodiment, the vibrator facility 118 may be mounted to the vibration distribution facility through the opening of the adjustable bed facility 102 section lateral surface 508. In an embodiment, the vibration motor 118 may be operatively connected to the vibration distribution facility, may be in contact with the vibration distribution facility, may not be in contact with the vibration distribution facility, or the like. In an embodiment, there may be a layer of resilient material, strong fabric, or the like between the vibrator motor 118 and the vibration distribution facility.

In an embodiment, any space between the vibration facility 118 and the opening of the adjustable bed facility 102 section may be filled with a vibration absorbent material such as foam, cotton matting, rubber, or the like. The absorbent material may provide a layer of vibration insulation between the vibration facility 118 and the adjustable bed facility 102 section opening.

In an embodiment, the combination of the vibration distribution facility and vibration facility 118 may be a vibration facility assembly. In an embodiment, the vibration facility 118 assembly may be attached to the adjustable bed facility 118 sections with the plurality of barbs or anchoring devices.

Referring again to FIG. 1, in an embodiment, the supports 120 may be hydraulic pressurized cylinders that may provide additional control of the decent of the adjustable bed facility 102 sections. The pressurized supports 120 may be designed to support a certain amount of weight that may include the skeleton structure 114, mattress 110, springs 108, user, and the like. In an embodiment, the pressurized cylinders may be similar to the type of supports that are used in automobile trunks to support the trunk open while the user access the trunk area.

In an embodiment, the supports 120 may provide a safety feature when combined with the safety bracket 112. The safety bracket 122 may prevent the actuators from forcibly pulling the adjustable bed facility 102 sections down; the safety bracket is described in more detail below. The supports 120 may be positioned on the sections that are actuated and may provide a controlled speed at which the sections will return to a horizontal position. In an embodiment, the support 120 may provide support of a weight that is less than the weight of the section, therefore the section will provide enough force (e.g. weight) on the support 120 to compress the cylinder and move the section down. In an embodiment, there may be more than one support 120 for each actuated adjustable bed facility 102 section. In an embodiment, the support 120 may be connected between the skeleton structure 114 and the sub-frame 112.

In an embodiment, the safety bracket 122 may be a slotted bracket that provides the connection between the actuators 104 and the skeleton structure 114 for the purpose of moving the adjustable bed facility 102 sections. A side of the slot that is farthest from the actuator 104 may be the slot first side and may be the side that the actuator 104 pushes on to move the adjustable bed 102 section up. A side of the slot that is nearest to the actuator 104 may be the slot second side and may be the side the actuator 104 pulls on to move the adjustable bed 102 section down. In an embodiment, when the actuator 104 is expanding and moving an adjustable bed facility 102 section it may apply a force on the first side of the slot and move the section in an upward direction. When the actuator 104 is retracted to move the section in a downward direction, the actuator 104 connection may move into the middle area (e.g. not in contact with the first or second side of the slot) of the safety bracket 122 slot. As the actuator 104 connection moves into the slot middle area, the adjustable bed facility 102 section may move in a downward motion under the force of section weight. In an embodiment, the actuator 104 may retract at the same speed as the safety bracket 122 moves, therefore the actuator 104 connection may stay in the safety bracket 122 slot middle area and not make contact with the second side of the safety bracket 122 slot. In this manner, the actuator 104 connection may not contact the second side of the slot and therefore the adjustable bed 102 section may not move in the downward direction by the force of the actuator 104.

In an embodiment, if the actuator 104 connection comes in contact with the second side of the safety bracket 122 slot, there may be a shutoff switch, shutoff indicator, or the like that may stop the retraction of the actuator 104.

In an embodiment, the adjustable bed facility 102 may include an electronic facility 124. In an embodiment, the electronic facility 124 may include a wire harness 128, a receiver 130, power outlets 138, modular controls 132, a power supply 140, a power connection 142, and the like. In an embodiment, different components of the electronic facility 124 may be individual components, combined components, individual and combined components, or the like. For example, the receiver 130, control box 134, and power supplied may be individual components, may be combined into a single component, may be a combination of individual and combined components, or the like. In an embodiment, the various electronic facility 124 components may be mounted on the sub-frame 112, skeleton structure 114, or the like as required for the particular component.

In an embodiment, the wire harness 128 may provide power and data connections to a plurality of modular controls 132. Depending on the power supply 140, the wire harness may provide either DC or AC power to the modular controls 132. In an embodiment, the data connections may be serial, parallel, or the like. In an embodiment, the wire harness may have the same number of power/data connections as there are possible modular controls 132. In an embodiment, the wire harness may be a unit of power/data connections that may be bound together into a single wire harness. In another embodiment, the wire harness may be a group of individual power/data connections. In an embodiment, for each individual wire in the bundle, group, or the like, a first end may have connections for the control box 134 and power supply 140. A second end of the wire harness 128 may be a power and data connection for each individual modular control 132.

In an embodiment, a receiver 130 may receive user commands from a remote control 148. In an embodiment, the receiver 130 may have a wireless or wired connection to the remote 148. In an embodiment, the wireless remote 148 to receiver 130 communication may be a radio frequency (RF) communication, infrared (IR) communication, Bluetooth communication, or the like. In an embodiment, the receiver 130 may receive the communication command from the remote 148 and transmit the remote 148 command to the control box 134. The communication with the control box 134 may be wireless or wired. In an embodiment, the wireless communication between the receiver 130 and the control box 134 may be a radio frequency (RF) communication, infrared (IR) communication, Bluetooth communication, or the like. In an embodiment, the receiver 130 may be combined with the control box 134 into a single component. In an embodiment, the skeleton structure 114 may be used as an RF antenna for receiving communication from the remote 148 to the receiver 130. In embodiment, the entire skeleton structure 114 may be used as an antenna, a portion of the skeleton structure 114 may be used as an antenna, or the like.

In an embodiment, the modular controls 132 may provide additional functionality to the adjustable bed facility 102 that may include a stereo, a CD player, an MP3 player, a DVD player, a lamp, power outlets 138, an air purification facility 144, or the like. The additional functionality that the modular controls 132 provide may be considered optional equipment that may be offered with the adjustable bed facility 102. For example, a user may be able to purchase an adjustable bed facility 102 without any modular controls 132 and may add modular controls as he or she desires. In another example, the user may purchase the adjustable bed facility 102 with modular controls already installed. In an embodiment, the modular controls 132 may have predetermined mounting locations on the sub-frame 112, skeleton structure 114, or the like.

In an embodiment, the modular controls 132 may directly control devices, indirectly control devices, or the like. For example, the modular control 132 may directly control a lamp that is connected to the modular control 132 but may indirectly control a device or facility that is plugged into an outlet 138 controlled by the modular control 132. The devices and facilities may include a stereo, CD player, DVD player, air purification facilities, or the like may receive power from power outlets 138 that are controlled by the modular control 132. In this example, the user control of the power outlet 138 to turn the device on or off but the user may not be able to control the individual device (e.g. the volume of stereo). In an embodiment, the user may control the additional function devices by using the remote 148 that may have an interface for each of the modular controls 132. For example, there may be an interface on the remote 148 for turning on a lamp, turning off a lamp, dimming a lamp, and the like. In a similar manner, the user may be able to control if a power outlet 138 provided by a modular control 132 is on or off.

In an embodiment, the modular controls 132 may be connected to the control box 134, power supply 140, or the like; the connection may be the wire harness 128. In an embodiment, the modular controls 132 may communicate with the control box 134 by a wireless means that may include radio frequency (RF), infrared (IR), Bluetooth, or other wireless communication type.

In an embodiment, the control box 134 may interpret commands received from the receiver 130 into commands for the various adjustable bed facility 102 components such as the actuators 104, the vibration facility 118, the modular controls 132, power outlets 138, and the like. In an embodiment, the control box 134 may contain a microprocessor, microcontroller, or the like to run a software application to interpret the commands received from the remote 148 through the receiver 130. In an embodiment, the software application may be interrupt based, polling based, or other application method for determining when a user has selected a command on the remote 148. In an embodiment, the software application may be stored in the control box 134, stored in bed memory 154, or the like and may be stored as software, as firmware, as hardware, or the like.

In an embodiment, the control box 134 may receive information from the receiver 130 by wired communication, wireless communication, or the like. In an embodiment, the wireless communication may be by radio frequency (RF), infrared (IR), Bluetooth, or other wireless communication type.

In an embodiment, after the control box 134 has interpreted the received user commands, the control box 134 may transmit the interpreted commands to the various controllers for the adjustable bed facility 102 components such as the actuators 104, vibrator facility 118, modular controls 132, power outlets 138, and the like. The control box 134 may transmit information that may be further interpreted by the components into commands for the individual components. For example, the control box 134 may receive a command to move the head section up. The control box 134 may interpret the remote 148 command into a command the actuator may understand and may transmit the command to extend the head section actuator to move the head section up.

In an embodiment, the power supply 140 may receive power from a standard wall outlet, fuse box, circuit box, or the like and may provide power to all the powered components of the adjustable bed facility 102. In an embodiment, the power supply 140 may provide DC power or AC power to the components. In an embodiment, if the power supply 140 provides DC power, the power supply 140 may convert the incoming AC power into DC power for the adjustable bed facility 102.

In an embodiment, the power outlets 138 may provide standard household AC current using a standard outlet for use by external devices using a standard plug. In an embodiment, the power outlets 138 may receive power directly from a standard wall outlet, a fuse box, a circuit box, or the like, but the control box 134 may control whether the power outlet 138 on or off. In an embodiment, the power outlet 138 may have a control circuit that may determine if the power outlet 138 is active (on) or inactive (off). In an embodiment, the command to indicate if the power outlet 138 is active or inactive may be received from the control box 134. In an embodiment, the control box 134 may receive commands for the power outlet 138 control from the remote 148.

In an embodiment, the power connection 142 may receive standard power for the adjustable bed facility 102 from a standard outlet, fuse box, circuit box, or the like. In an embodiment, the power connection 142 may provide standard AC power to the power outlets 138, the power supply 140, or the like.

In an embodiment, the air purification facility 144 may be any type of device or facility that may be capable of improving that air environment in the area of the adjustable bed facility 102. In an embodiment, the air purification facility 144 may be an absorbent type (e.g. carbon), electro-static, HEPA filter, or the like. In an embodiment, absorbent materials may be used in a filter, in the adjustable bed facility 102, in the mattress 110, or the like to absorbed odor, dust, contaminants, or the like from the air environment around the bed, within the bed, or the like. In an embodiment, electrostatic or iconic air filters may use negative ions to attract dust, contaminants, and the like from the air. In an embodiment, electro-static materials (e.g. tourmaline) may be used in a filter, in the adjustable bed facility 102, in the mattress 110, or the like to absorbed odor, dust, contaminants, or the like from the air environment around the bed, within the bed, or the like. In an embodiment, HEPA filters are composed of a mat of randomly arranged fibers that are designed to trap at least 99.97% of dust, pollen, mold, bacteria, and any airborne particles with a size of 0.3 micrometers ($\mu$m) at 85 liters per minute (Lpm). The HEPA filter may be used in a device, facility, or the like for filtering the air in the area of the adjustable bed facility 102.

In an embodiment, the air purification facility 144 may be part of the adjustable bed facility 102, a freestanding device or facility, or the like. In an embodiment, if the air purification facility 144 is part of the adjustable bed facility 102 the air purification facility 144 may be attached to any part of the adjustable bed facility 102 such as the mattress 110, subframe 112, skeleton structure 114, or the like. In an embodiment, the air purification facility 144 that is attached to the adjustable bed facility 102 may be controlled direct control of the air purification facility 144, control using the remote 148, or the like.

In an embodiment, the air purification facility 144 may be a free standing device that may be plugged into an adjustable bed facility 102 power outlet 138 and therefore may be controlled with the remote 148 controlling the on/off condition of the power outlet 138.

In an embodiment, the air purification facility 144 may be a freestanding device that may be connected to an adjustable bed facility 102 modular control 128. The modular control may provide power (AC or DC), control communication, and the like to the air purification facility 114. In an embodiment, the user may be able to control the air purification facility 144 using the remote 148 to control the modular controls 132.

In an embodiment, the remote 148 may be a user controlled device to provide control commands to the control box 134 to command certain functions of the adjustable bed facility 102. In an embodiment, the certain functions may be adjustable bed facility section movement (e.g. up or down), vibration control, modular controlled 132 devices, or the like. In an embodiment, the remote 148 may communicate with the control box using wired communication, wireless communication, or the like. In an embodiment, the wireless communication may be using a radio frequency (RF), infrared (IR), Bluetooth, or the like. If the remote communicates using a wireless technology, the communication may be with the receiver 130 and the receiver 130 may pass the command request to the control box 134.

In an embodiment, the user may indicate the certain adjustable bed facility 102 function using the remote 148 by pressing a button, touching a screen, entering a code, speaking a command, or the like. In an embodiment, the control box 134, using the receiver 130, may receive and interpret the command provided by the remote 148. In an embodiment, the certain functions available on the remote may instruct the control box 134 to directly control a device (e.g. actuator 104), control a modular control 132 connected device, or the like. The remote may control devices with commands that may include on, off, high power, medium power, low power, volume, play, fast forward, rewind, skip, modular device to control, or the like. For example, the remote 148 may transmit a command to move the head section up and the control box 134 may command the actuator 104 to extend a certain amount in response to the command. In another example, the remote 148 may command that a modular control 132 connected lamp be turned off. The control box 134 may command the control box 132 to turn off the lamp.

In an embodiment, the remote 148 may save adjustable bed facility 102 user preferred settings to a plurality of memory locations that may be used to maintain the user determined bed position, an adjustable bed facility 102 historical setting, or the like. For example, the user may have a certain preferred adjustable bed facility 102 position that may be stored in at least one of the memory locations that the user may be able to later recall to move the adjustable bed facility into the user preferred position. By indicating the recall of the at least one memory locations, the adjustable bed facility 102 control box 134 may command the various components to move to the stored memory location position to achieve the recalled position. In an embodiment, for a remote 148 that may contain buttons, the user may press a single button, a combination of buttons, or the like to recall the memory position desired.

In an embodiment, the remote 148 may have buttons, an LCD screen, a plasma screen or the like to allow the user to indicate the desired command. In an embodiment, the user may press a button to indicate a command to the control box 134. In an embodiment, the LCD or plasma screens may be touch screen sensitive. In an embodiment, the remote 148 screen may present the available controls to the user and the user may touch the screen to indicate the command desired. For example, the remote 148 screen may only present controls that are available in the adjustable bed facility 102; therefore if a modular control 132 is not available, the remote 148 may not display a selection for that modular control 132. In an embodiment, the remote 148 screen may present content sensitive selections to the user. For example, if the user selected to control a CD player, the user may be presented with CD player controls that may include play, fast forward, rewind, skip, stop, repeat, or the like.

In an embodiment, the remote 148 may provide feedback to the user to indicate the success of the certain command. In an embodiment, the feedback may be an audio feedback, a visual feedback, a forced feedback, or the like. In an embodiment, the feedback types may be used individually or in combination. In an embodiment, the audio feedback may be a sound that indicates that the command was successful, failed, is in progress, in conflict with a command in progress, failed for safety reasons, or the like. In an embodiment, the visual feedback may be an indication of the remote 148 screen that indicates that the command was successful, failed, is in progress, in conflict with a command in progress, failed for safety reasons, or the like. In an embodiment, the forced feedback may be a vibration that indicates that the command was successful, failed, is in progress, in conflict with a command in progress, failed for safety reasons, or the like.

In an embodiment, a memory facility 150 may contain components that are intended to maintain certain memory locations for the control box to access, receiver to access, and the like. In an embodiment, the memory facility 150 may include a receiver learn facility 152, a bed memory 154, a backup battery 158, and the like. In an embodiment, the receiver learn facility 152, bed memory 154, and backup battery 158 may be in a single memory facility 150 or may be in more than one memory facilities 150. In an embodiment, the memory facility 152 may be part of the adjustable bed facility 102, part of the electronic facility 124, a separate facility, or the like. In an embodiment, the receiver learn facility 152, bed memory 154, and backup battery 158 may not be part of the memory facility 150, but may be combined into other facilities or devices, be stand-alone devices, or the like.

In an embodiment, the receiver learn facility 152 may act to establish the communication link between the remote 148 and the receiver 130 where the communication between the remote 148 and receiver 130 is a wireless connection. In an embodiment, the communication link between the remote 148 and the receiver 130 may need to be a unique connection to assure that the remote 148 communicates with only one receiver 130 within one adjustable bed facility 102. In an embodiment, the receiver learn facility 152 may be used to provide a unique communication between any remote 148 and any adjustable bed facility 102. For example, a remote 148 may be used to communicate with a first adjustable bed facility 102 and may be used to establish communication between the same remote and a second adjustable bed facility 102. The remote 148 may only be able to communicate with one adjustable bed facility 102 at a time.

In an embodiment, a learn protocol between the remote 148 and receiver 130 may be user initiated by pressing a button on the receiver learn facility 152, powering up the receiver learn facility 152, bringing the receiver learn facility 152 within a certain proximity of the receiver 130, indicating on the remote 148 to begin the learn protocol, or the like. In an embodiment, the learn protocol may be fully automatic, semi-automatic with user intervention, manual, or the like. In an embodiment, a user may select a channel, frequency, or the like during learn protocol or after the learn protocol. The changing of the channel, frequency, or the like may prevent two different remote 148 and receiver 130 combinations from interfering with other wireless communication devices. In an embodiment, each time the learn protocol is executed, a new unique communication link may be established; there may be a plurality of unique communication links available for each remote 148 and receiver 130 combination.

In an embodiment, the bed memory 154 may be the memory location where the control box 134 stores user desired preset information, software for interpreting remote 148 commands, demonstration software, and the like. In an embodiment, the bed memory 154 may be removable memory. For example, the bed memory 154 may be moved from a first adjustable bed facility 102 to a second bed facility 102 to move user settings from the first adjustable bed facility 102 to the second bed facility 102. In this manner the bed memory 154 may be considered portable memory. In an embodiment, the removable bed memory 154 may be flash memory, programmable logic circuit (PLC) memory, secure digital (SD) memory, mini SD memory, Compact Flash type I memory, Compact Flash type II memory, Memory Stick, Multimedia Card, xD Picture card, Smartmedia, eXtreme Digital, Microdrive, or the like.

In an embodiment, the removable bed memory 154 may be used to upgrade the adjustable bed facility 102 memory and software. For example, if new control box 134 software was developed to provide better control over one of the adjustable bed facility 102 components, the software may be saved to a new replaceable memory that may be used in the place of the existing replaceable memory. In this manner, the software of the adjustable bed facility 102 could be upgraded just by providing the user with a new replaceable memory.

In an embodiment, the removable memory may be used to provide a sales enterprise with adjustable bed facility 102 demonstration software where the enterprise may be able to indicate at least one of a plurality of demonstrations for a user. For example, the user may be interested in how the adjustable bed facility 102 sections may be adjusted and the enterprise may select a demonstration to shows all the section motion available. In an embodiment, before an adjustable bed facility 102 is shipped to a user, the enterprise may remove the demonstration removable memory and replace it with a standard adjustable bed facility 102 bed memory 154.

In an embodiment, the backup battery 158 may be used to provide power to volatile memory, provide power to the receiver learn facility 152, provide power to the programmable logic circuit (PLC) memory, or the like.

In an embodiment, the memory connection 160 may be any connection type that provides a connection between the bed memory 154, control box 134, and the like. In an embodiment, the memory connection 160 may be a wired or wireless connection. The wired connection may be a USB connection, a serial connection, parallel connection, or the like. The wireless connection may be by radio frequency (RF), infrared (IR), Bluetooth, or the like. In an embodiment, the memory connection 160 may be in a location that is easy for the user to access the bed memory 154, may be attached to the memory facility 150, may be attached to the control box 134, or the like. In an embodiment, the easy access memory connection may be on the side of the adjustable bed facility 102, on a rail of the adjustable bed facility 102, under the adjustable bed facility 102, or the like.

In an embodiment, the network connection 162 may be used to connect the control box 134 to a network connection. In an embodiment, the network connection may be a LAN, a WAN, an Internet, an intranet, peer-to-peer network, or the like. Using the network connection 162, the control box 134 may be able to communicate with computer devices on the network. In an embodiment, the network connection 162 may be a wired or wireless connection.

In an embodiment, using the network connection 162, the control box 134 may be able to communicate with the network to periodically check for software updates. In an embodiment, if a software update is located, the control box 134 may send the user an email, instant messenger message, phone message, phone call, cell phone message, cell phone call, fax, pager message, or the like to indicate that software updates are available. The user, using the device that received the notice of software, may send a reply to the control box that the software upgrade should be downloaded, should not be downloaded, or the like.

In an embodiment, an adjustable bed facility 102 enterprise, an adjustable bed facility 102 manufacturer, an adjustable bed facility 102 service enterprise, or the like may send the control box 134 software updates using the network connection 162. In an embodiment, an adjustable bed facility 102 enterprise, an adjustable bed facility 102 manufacturer, an adjustable bed facility 102 service enterprise, or the like may notify the user of available software upgrades for the adjustable bed facility 102 by email, instant messenger message, phone message, phone call, cell phone message, cell phone call, fax, pager message, or the like. The user, using the device that received the notice of software, may send a reply to the adjustable bed facility 102 enterprise, the adjustable bed facility 102 manufacturer, the adjustable bed facility 102 service enterprise, or the like that the software upgrade should be downloaded, should not be downloaded, or the like.

Referring now to FIG. 4, an embodiment of shipping and assembling a mattress retaining bracket 402 is shown. The mattress retaining bracket 402 may be used to hold the mattress 110 (not shown) in place on the adjustable bed facility 102 as the adjustable bed facility 102 sections are adjusted. For example, as the head section is adjusted up, the mattress 110 may tend to slide down towards the foot of the bed, the mattress retaining bracket 402 may stop the mattress from sliding and may maintain the mattress 110 in the proper position on the adjustable bed facility 102. In an embodiment, there may be a mattress retaining 402 bracket at the head section and/or the foot section of the adjustable bed facility 102.

In an embodiment, the mattress retaining bracket 402 may be made of materials that include metal, plastic, rubber, wood, or the like. In an embodiment, the materials may be used individually or in combination.

In an embodiment, as shown in VIEW A, when the adjustable bed facility 102 is shipped to the user, the mattress retaining bracket 402 may be mounted upside down at the final location of the mattress retaining bracket 402. This mounting method may provide benefits that may include mattress retaining bracket 402 breakage prevention, mattress retaining bracket 402 bending prevention, clear user understanding of the final mattress retaining bracket 402 location, prevention of the mattress retaining bracket 402 becoming lost, and the like. In an embodiment, as shown in VIEW B, once the user receives the adjustable bed facility 102 with the upside down mounted mattress retaining bracket 402, the user may rotate the mattress retaining bracket 402 into the upright position and re-secure it to the adjustable bed facility 102.

Figure 6:
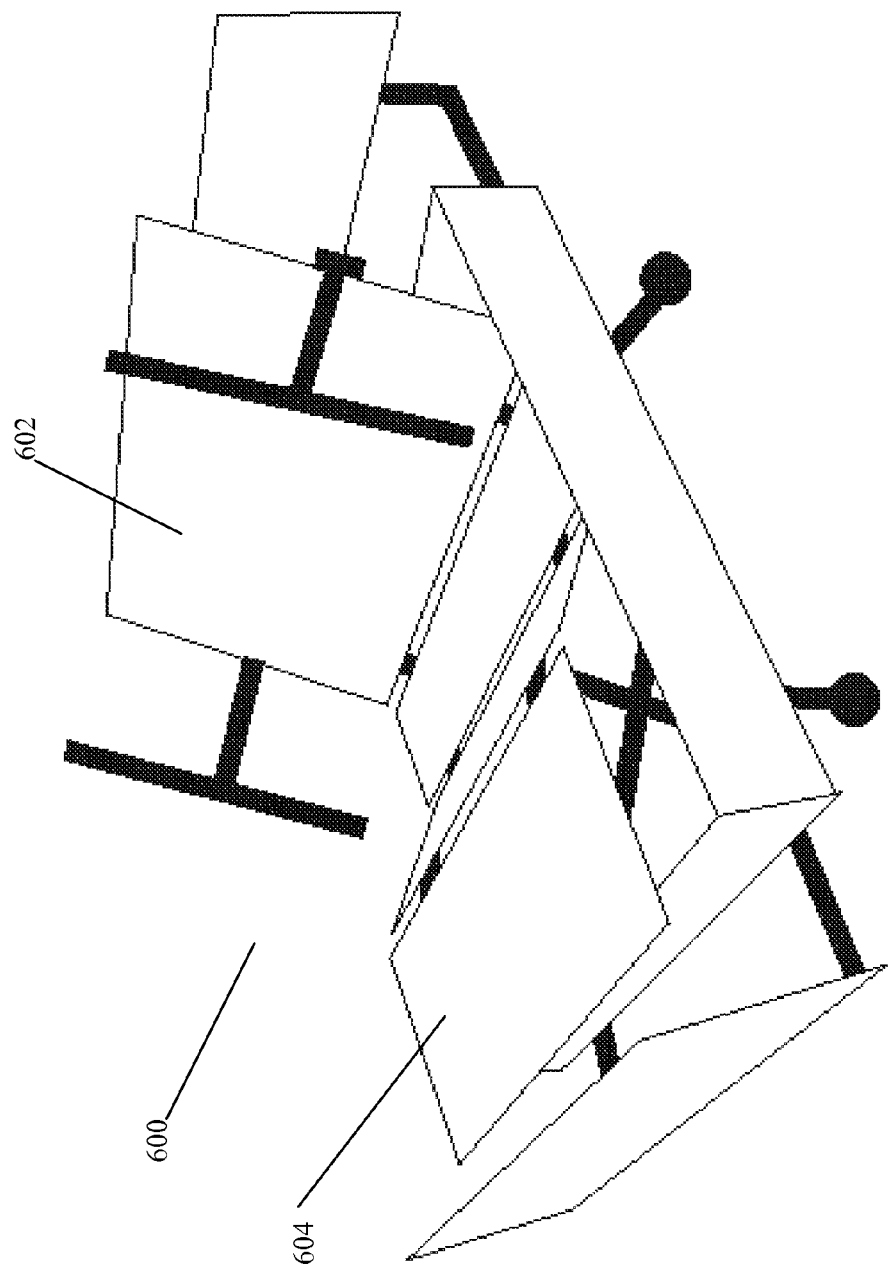
FIG. 6 shows a typical hospital adjustable bed.

Referring to FIG. 6, an example of an adjustable bed 600 (without the mattress) is shown with the head 602 and foot 604 sections raised to an elevated position. This adjustable bed 600 shows that sections, in this case the foot 604 section, may be divided into more than one section to provide contouring of bed sections.

Figure 7:
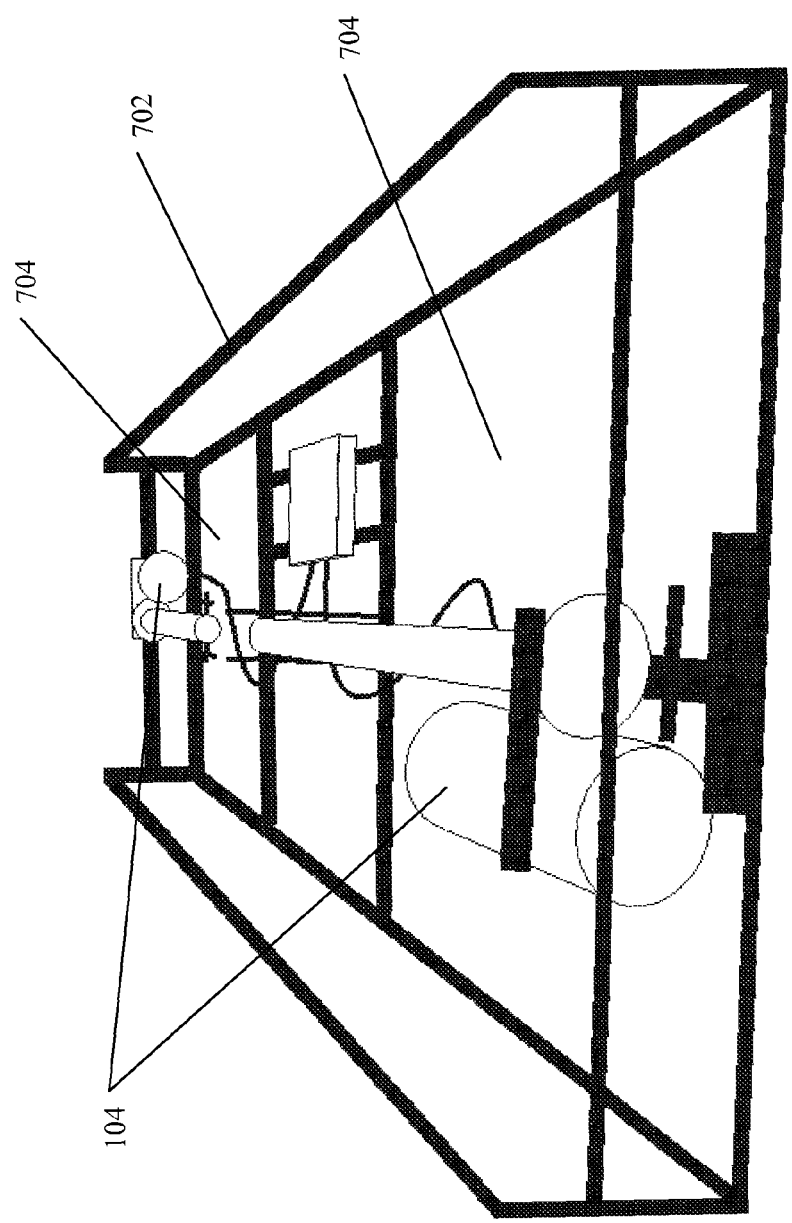
FIG. 7 shows one use of actuators connected to the bed frame and the adjustable sections.

Referring to FIG. 7, an example of actuators 104 connected to the bed frame 702 and the adjustable sections 704 is shown. In this case two actuators 104 are used, one for each adjustable bed section 704.

Figure 8:
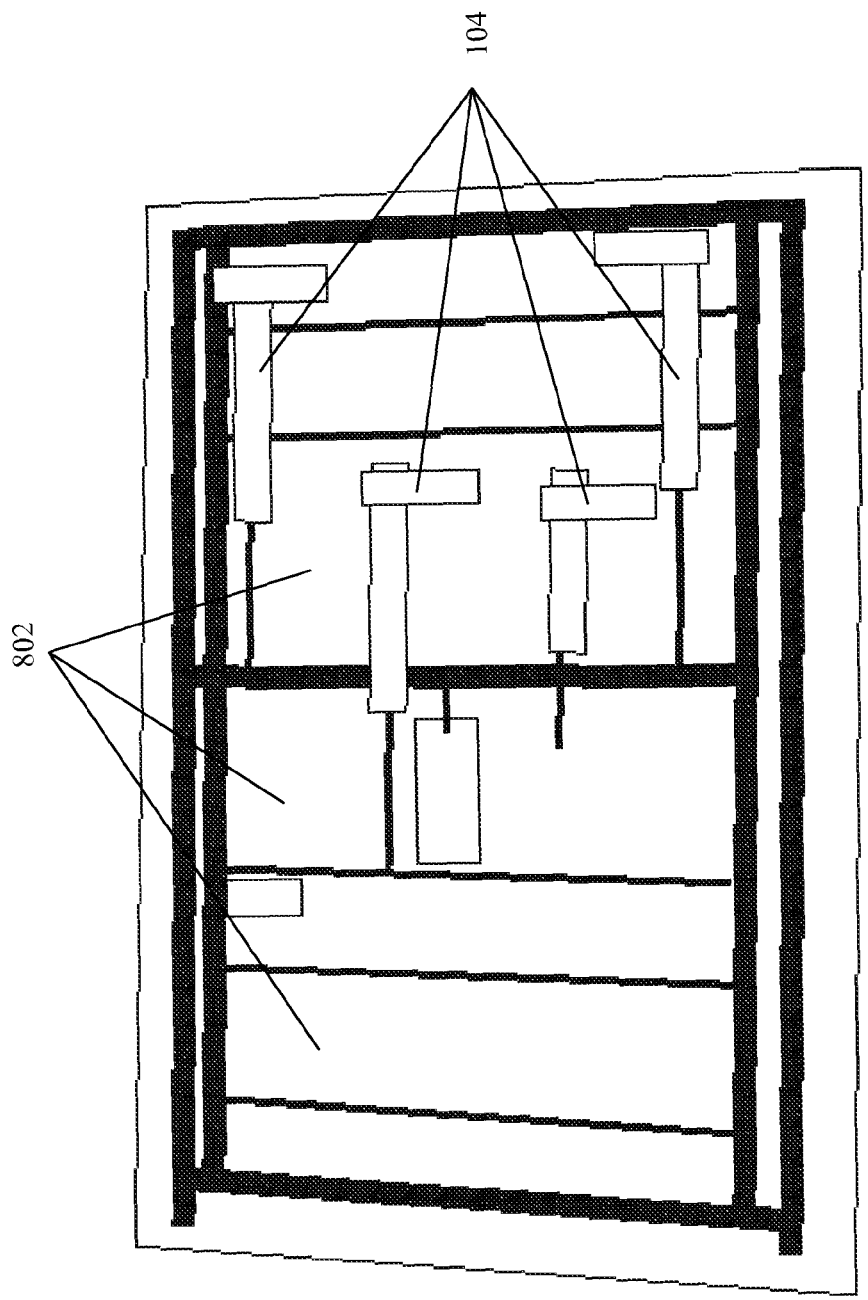
FIG. 8 shows more than one actuator for each adjustable bed section, in this case there are two actuators for each adjustable section.

Referring to FIG. 8, an example of more than one actuator 104 for each adjustable bed section 802 is shown, in this case there are two actuators 104 for each adjustable section 802. In embodiments, more than one actuator 104 per section 802 may be used if the bed sections 802 are heavy, smaller actuators 104 are used, if the bed is a wide bed (e.g. king bed), or the like.

Figure 9:
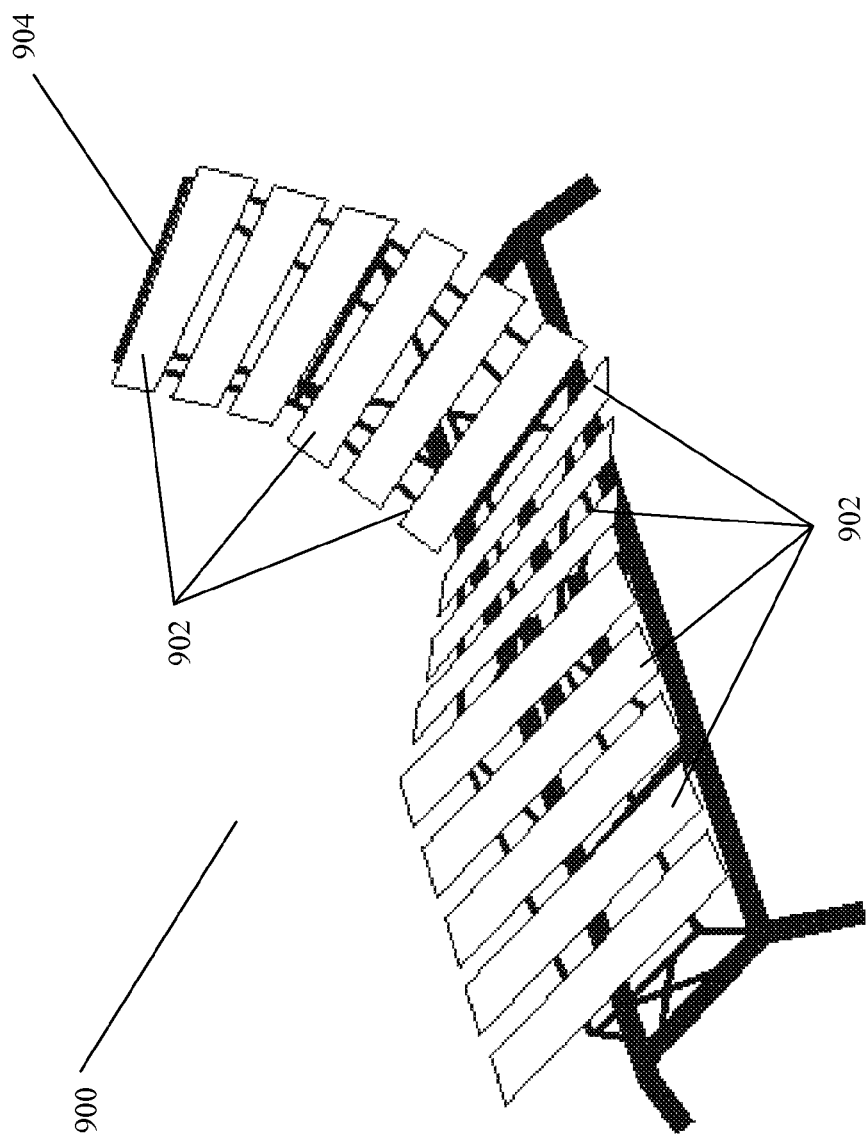
FIG. 9 shows an adjustable bed using slats instead of wood decking for the foundation of the adjustable sections.

Referring to FIG. 9, an example of an adjustable bed 900 using slats 902 instead of wood decking for the foundation of the adjustable sections is shown. In embodiments, the slats 902 may be wood, plastic, rubber, cloth, elastic material, or the like. Using this design, the adjustable bed 900 may be provided with curved contours has shown in the head section 904. In an embodiment, the curved sections may be constructed of a number of small connected individual sections.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. An adjustable bed controller, comprising:
  a cellular phone including a wireless module for communicating with an adjustable bed that includes one or more articulating portions; and
  a touch screen on the cellular phone that presents one or more controls based upon whether the one or more controls are available in the adjustable bed facility, wherein the one or more controls include a graphical representation of a user control that receives a user input to control the one or more articulating portions of the adjustable bed, the user control responsive to the user input with a control signal transmitted to the adjustable bed using the wireless module.

2. The adjustable bed controller of claim 1, wherein the adjustable bed includes an air inflatable mattress having an air pressure, the one or more controls further including a second user control that receives a second user input to control an air pump to regulate the air pressure in the air inflatable mattress.

3. The adjustable bed controller of claim 1, wherein the wireless module communicates with a programmable logic controller (PLC) associated with the adjustable bed.

4. The adjustable bed controller of claim 1, wherein the adjustable bed includes a vibration motor, the one or more controls further including a second user control that receives a user input to control the vibration motor.

5. The adjustable bed controller of claim 1 wherein the wireless module communicates using a Bluetooth protocol.

6. The adjustable bed controller of claim 1 wherein the wireless module communicates using a WiFi protocol.

7. The adjustable bed controller of claim 1 wherein the graphical representation of the user control includes a depiction of a linear slider.

8. The adjustable bed controller of claim 1 wherein the graphical representation of the user control includes a depiction of a circular slider.

9. The adjustable bed controller of claim 1 wherein the graphical representation of the user control includes a depiction of a button.

10. The adjustable bed controller of claim 1 wherein the wireless module receives information signals from the adjustable bed.

11. The adjustable bed controller of claim 10 wherein the wireless module receives information signals including a feedback relating to a position of the one or more articulating portions.

12. The adjustable bed controller of claim 11 wherein the feedback is displayed on the touch screen.

13. The adjustable bed controller of claim 10 wherein the wireless module receives information signals including error reporting from the adjustable bed.

* * * * *

US007805785C1

(12) EX PARTE REEXAMINATION CERTIFICATE (9992nd)
United States Patent
Rawls-Meehan

(10) Number: US 7,805,785 C1
(45) Certificate Issued: *Dec. 26, 2013

(54) METHODS AND SYSTEMS OF AN ADJUSTABLE BED

(76) Inventor: Martin B Rawls-Meehan, Lexington, MA (US)

Reexamination Request:
No. 90/011,777, Jun. 29, 2011

Reexamination Certificate for:
Patent No.: 7,805,785
Issued: Oct. 5, 2010
Appl. No.: 11/875,851
Filed: Oct. 20, 2007

( * ) Notice: This patent is subject to a terminal disclaimer.

Related U.S. Application Data

(63) Continuation of application No. 11/855,354, filed on Sep. 14, 2007.

(60) Provisional application No. 60/825,607, filed on Sep. 14, 2006.

(51) Int. Cl.
*A61G 7/002* (2006.01)
*G05D 1/02* (2006.01)

(52) U.S. Cl.
USPC ............................................. 5/616; 700/302

(58) Field of Classification Search
None
See application file for complete search history.

(56) References Cited

To view the complete listing of prior art documents cited during the proceeding for Reexamination Control Number 90/011,777, please refer to the USPTO's public Patent Application Information Retrieval (PAIR) system under the Display References tab.

*Primary Examiner* — Russell Stormer

(57) ABSTRACT

Aspects of this invention relate to an adjustable bed that may include one or more articulating portions, and may include one or more components, including an air inflatable mattress associated with the adjustable bed frame, a programmable logic controller, a remote memory storage facility, a remote storage location of user preferences, a cell phone remote control, a modular control device, an air purification facility, a power outlet controller, a Bluetooth remote control, an ultra wide band remote control, a wireless USB remote control, and the like.

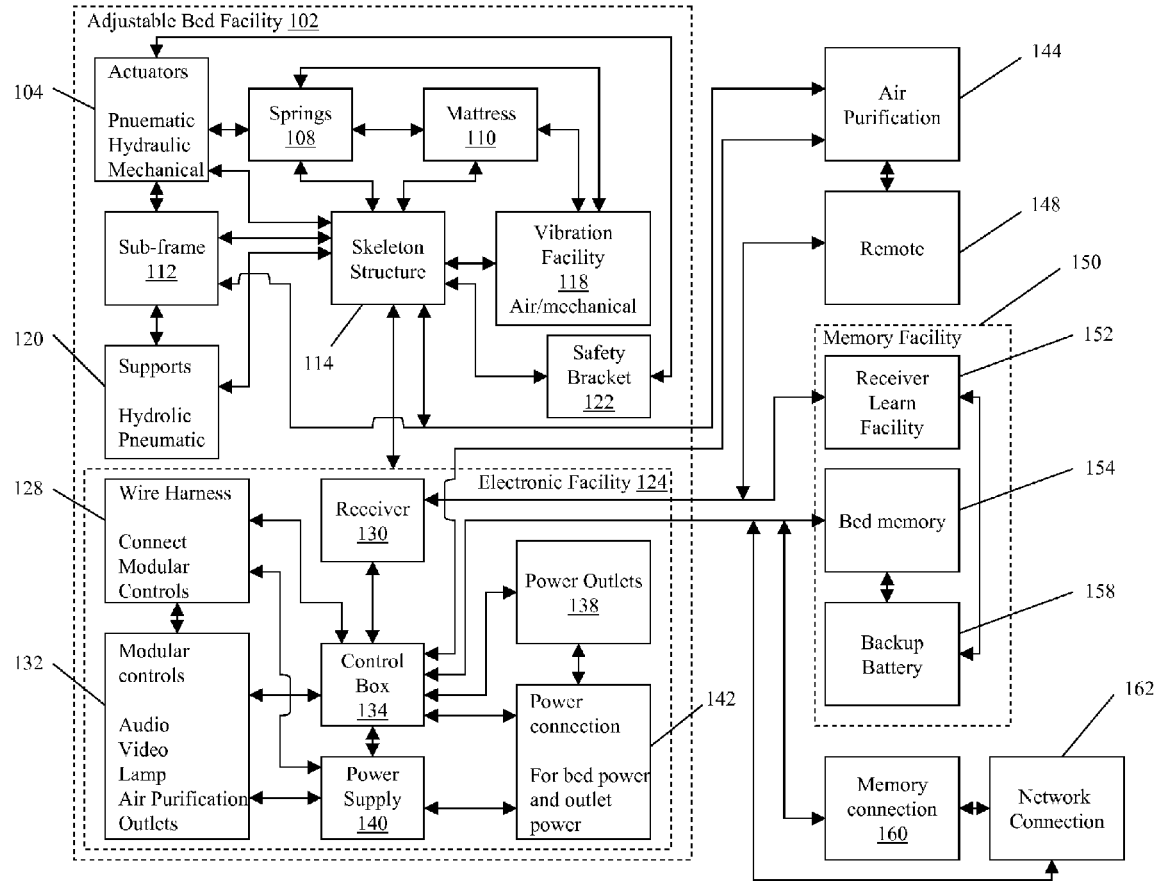

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-13 are cancelled.

\* \* \* \* \*